(12) United States Patent
Yamazaki

(10) Patent No.: US 11,099,791 B2
(45) Date of Patent: Aug. 24, 2021

(54) INFORMATION PROCESSING APPARATUS AND METHOD OF CONTROLLING THE SAME WITH AN APPLICATION REINSTALLATION FEATURE

(71) Applicant: CANON KABUSHIKI KAISHA, Tokyo (JP)

(72) Inventor: Daisuke Yamazaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/430,534

(22) Filed: Jun. 4, 2019

(65) Prior Publication Data

US 2019/0384539 A1 Dec. 19, 2019

(30) Foreign Application Priority Data

Jun. 18, 2018 (JP) .............................. JP2018-115426

(51) Int. Cl.
*G06F 3/12* (2006.01)
(52) U.S. Cl.
CPC ............ *G06F 3/1204* (2013.01); *G06F 3/121* (2013.01); *G06F 3/1225* (2013.01); *G06F 3/1236* (2013.01)
(58) Field of Classification Search
CPC .... G06F 3/1204; G06F 3/1225; G06F 3/1236; G06F 3/121; G06F 9/4415; G06F 3/1289; G05B 2219/1207; G05B 2219/23304; G05B 2219/23318; G05B 2219/31422; G05B 2219/32413; H04L 29/08306; H04L 67/14; H04M 2250/64
See application file for complete search history.

(56) References Cited

U.S. PATENT DOCUMENTS

| | | | | |
|---|---|---|---|---|
| 8,368,915 | B1 * | 2/2013 | Feeser | G06F 3/1225 358/1.15 |
| 9,519,450 | B1 * | 12/2016 | Feeser | G06F 9/4411 |
| 10,298,800 | B2 | 5/2019 | Yasuhara et al. | |
| 2003/0160989 | A1 * | 8/2003 | Chapin | G06F 3/1204 358/1.13 |
| 2007/0061803 | A1 * | 3/2007 | Barrett | G06F 11/0748 717/178 |
| 2009/0271781 | A1 * | 10/2009 | Cui | G06F 8/61 717/173 |
| 2011/0102836 | A1 * | 5/2011 | Kawaura | G06F 3/1204 358/1.15 |

(Continued)

FOREIGN PATENT DOCUMENTS

JP 2018033005 A 3/2018

*Primary Examiner* — Juan M Guillermety
(74) *Attorney, Agent, or Firm* — Rossi, Kimms & McDowell LLP

(57) ABSTRACT

According to the present invention, an information processing apparatus is provided. The apparatus comprises: a determination unit that determines a result of installation processing of an application from an external server that stores the application to a device; a download unit that downloads the application from the external server if it is determined that the external server cannot be referred to; and a transmission unit that transmit, to the device, an installation instruction for the application together with location information indicating a download destination to which the application was downloaded.

20 Claims, 23 Drawing Sheets

(56) References Cited

U.S. PATENT DOCUMENTS

| | | | |
|---|---|---|---|
| 2014/0109076 A1* | 4/2014 | Boone | H04L 67/2842 |
| | | | 717/170 |
| 2014/0330895 A1* | 11/2014 | Kang | H04L 67/104 |
| | | | 709/203 |
| 2016/0350094 A1* | 12/2016 | Lee | G06F 8/61 |
| 2017/0075672 A1* | 3/2017 | Matthew | G06F 8/61 |
| 2020/0019393 A1* | 1/2020 | Vichare | G06F 8/60 |

* cited by examiner

TO FIG. 6B

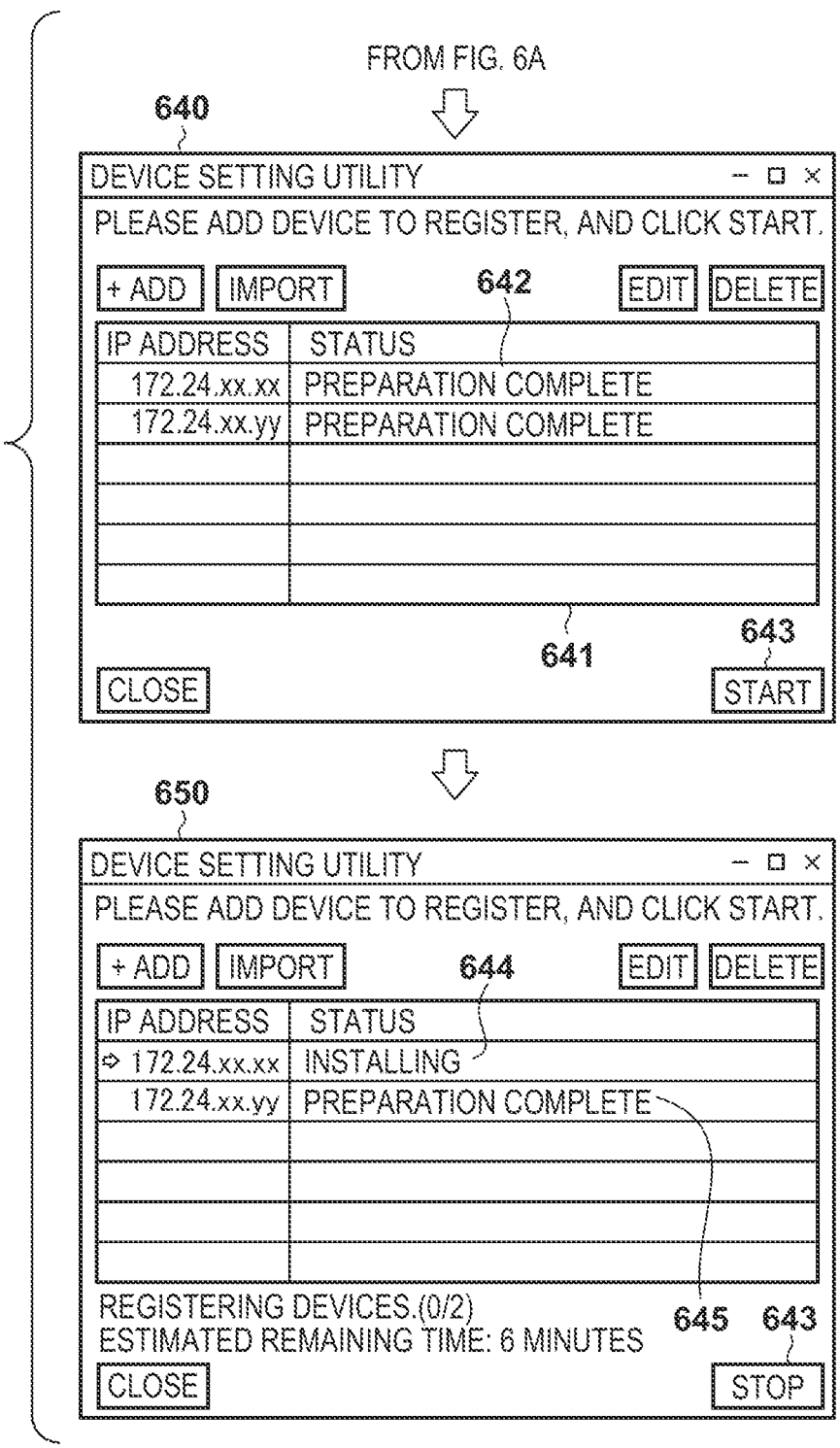

FIG. 7

```
700 — "Packages" : [
        {
          "Name" : "LOGIN + SCAN + PRINT", — 711
          "Applications" : [
            {
              "Name": "LOGIN APPLICATION 1", — 712
              "Version": "1.0.0", — 713
              "Id": "0d1e22a6-b474-46d3-b48a-87e52cb383a5", — 714
702       {   "Download-Url-App": "http://download.xxxxx.net/download/meap/LoginApp1_1.0.0.app",   715
              "Download-Url-Lic": "http://download.xxxxx.net/download/LoginApp1_1.0.0.lic"
            },                                                                                    716
            {
              "Name": "PRINT APPLICATION 1",
              "Version": "1.0.0",
701           "Id": "82ef79c7-8094-45dc-beb7-385829c3d3d4",
              "Download-Url-App": "http://download.xxxxx.net/download/PrintApp1_1.0.0.app",
              "Download-Url-Lic": "http://download.xxxxx.net/download/PrintApp1_1.0.0.lic"
            },
            {
              "Name": "SCAN APPLICATION 1",
              "Version": "1.0.0",
              "Id": "36c8cd83-5698-4ac7-93b0-acc78757f88b",
              "Download-Url-App": "http://download.xxxxx.net/download/ScanApp1_1.0.0.app",
              "Download-Url-Lic": "http://download.xxxxx.net/download/ScanApp1_1.0.0.lic"
            }
          ]
        },
        {
          "Name" : "LOGIN + PRINT", — 721
          "Applications" : [
            {
              "Name": "LOGIN APPLICATION 1",
              "Version": "1.0.0",
              "Id": "0d1e22a6-b474-46d3-b48a-87e52cb383a5",
              "Download-Url-App": "http://download.xxxxx.net/download/LoginApp1_1.0.0.app",
              "Download-Url-Lic": "http://download.xxxxx.net/download/LoginApp1_1.0.0.lic"
            },
            {
              "Name": "PRINT APPLICATION 1",
              "Version": "1.0.0",
              "Id": "82ef79c7-8094-45dc-beb7-385829c3d3d4",
              "Download-Url-App": "http://download.xxxxx.net/download/PrintApp1_1.0.0.app",
              "Download-Url-Lic": "http://download.xxxxx.net/download/PrintApp1_1.0.0.lic"
            }
          ]
        }
      ]
```

FIG. 8

```xml
<?xml version="1.0" encoding="UTF-8"?>
<device>
    <ip>172.24.xx.xx</ip>                                           ─811
    <serialNumber>AA1234</serialNumber>                             ─812
    <productName>MFP 5535<productName>                              ─813
    <deviceID>8ab1e7a0-69c8-49ed-b07d-e0b05fe049ca<deviceID>        ─814
    <installedApplication>
        <id>8a820eb1-bd9d-4779-a36a-ea97dea35e07</id>               ─821
        <version>3.0.0.0</version>                                  ─822
        <name>INSTALLATION SERVICE</name>                           ─823
        <installDate>2018-04-06</installDate>                       ─824
        <status>Started</status>                                    ─825
    </installedApplication>
    <installedApplication>
        <id>ea84b062-c702-4859-88e6-aed45cc0d8eb</id>
        <version>2.19.7.6</version>
        <name>APPLICATION MANAGEMENT SERVICE</name>
        <installDate>2018-04-06</installDate>
        <status>Started</status>
    </installedApplication>
    <installedApplication>
        <id>9f265da6-4f67-43a1-a7a2-edef9eabda0c</id>
        <version>2.0.0.0</version>
        <name>DEFAULT LOGIN APPLICATION</name>
        <installDate>2018-04-06</installDate>
        <status>Started</status>
    </installedApplication>
    <installedApplication>
        <id>057148fa-1b6a-4580-9a8e-4b46bc90d857</id>
        <version>1.0.1</version>
        <name>DEFAULT PRINT APPLICATION</name>
        <installDate>2018-04-06</installDate>
        <status>Started</status>
    </installedApplication>
    <installedApplication>
        <id>219d381d-6025-462f-a126-a7d44158139c</id>
        <version>1.0.1</version>
        <name>DEFAULT SCAN APPLICATION</name>
        <installDate>2018-04-06</installDate>
        <status>Started</status>
    </installedApplication></device>
```

800 — outer box
801 — installedApplication block

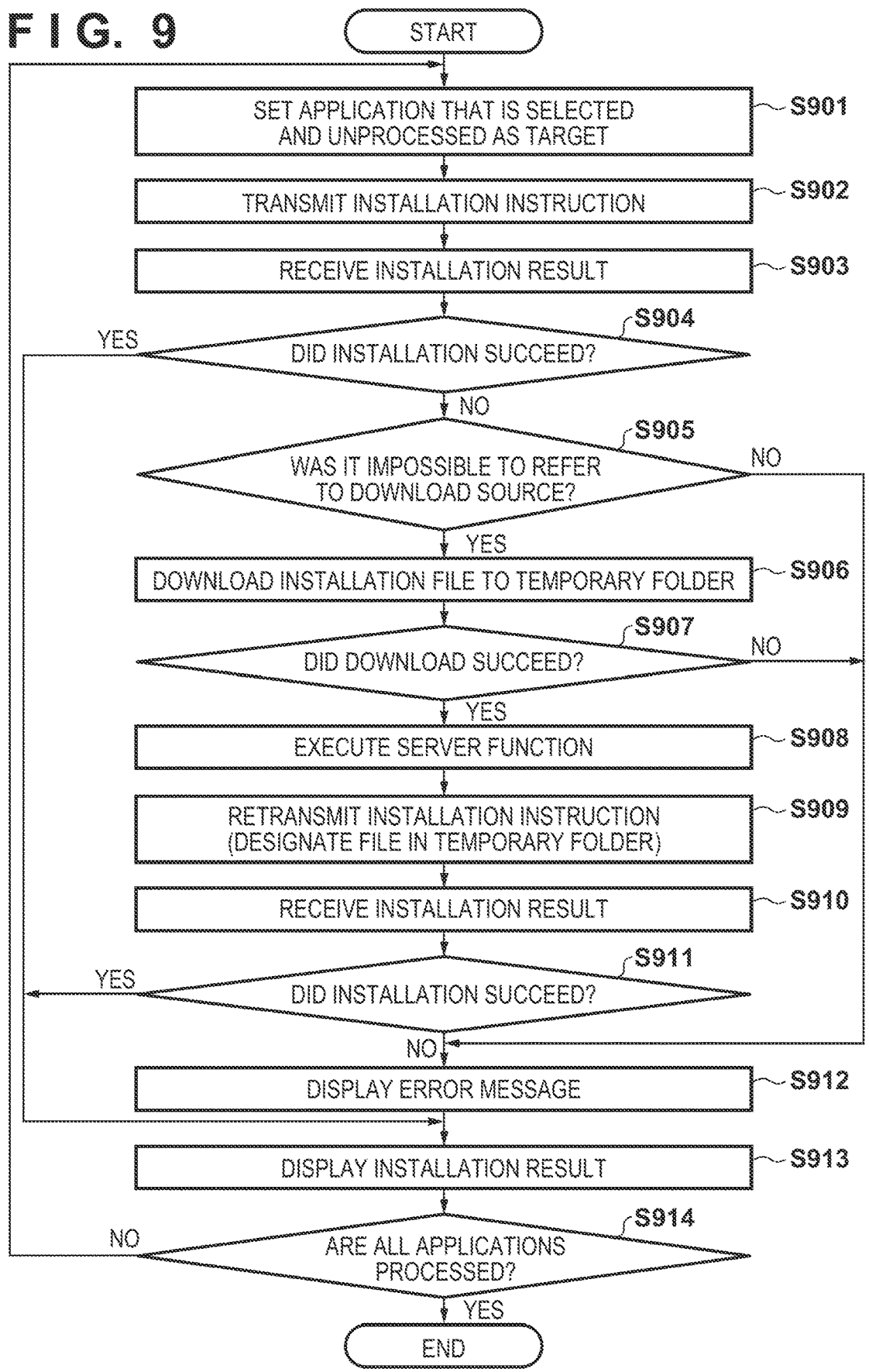

FIG. 14

```xml
<?xml version="1.0" encoding="UTF-8"?>
<Items>
<Item Name="Timeout">600000</Item>
<Item Name="Url">
<Application Name="LOGIN APPLICATION 1" Version="1.0.0" Id="82ef79c7-8094-45dc-beb7-385829c3d3d4">
<DownloadAppUrl>http://localServer/download/LoginApp1_1.0.0.app</DownloadAppUrl>
<DownloadLicUrl>http://localServer/download/LoginApp1_1.0.0.lic</DownloadLicUrl>
</Application>
<Application Name="PRINT APPLICATION 1" Version="1.0.0" Id="82ef79c7-8094-45dc-beb7-385829c3d3d4">
<DownloadAppUrl>http://localServer/download/PrintApp1_1.0.0.app</DownloadAppUrl>
<DownloadLicUrl>http://localServer/download/PrintApp1_1.0.0.lic</DownloadLicUrl>
</Application>
<Application Name="SCAN APPLICATION 1" Version="1.0.0" Id="36c8cd83-5698-4ac7-93b0-acc78757f88b">
<DownloadAppUrl>http://localServer/download/ScanApp1_1.0.0.app</DownloadAppUrl>
<DownloadLicUrl>http://localServer/download/ScanApp1_1.0.0.lic</DownloadLicUrl>
</Application>
</Item>
</Items>
```

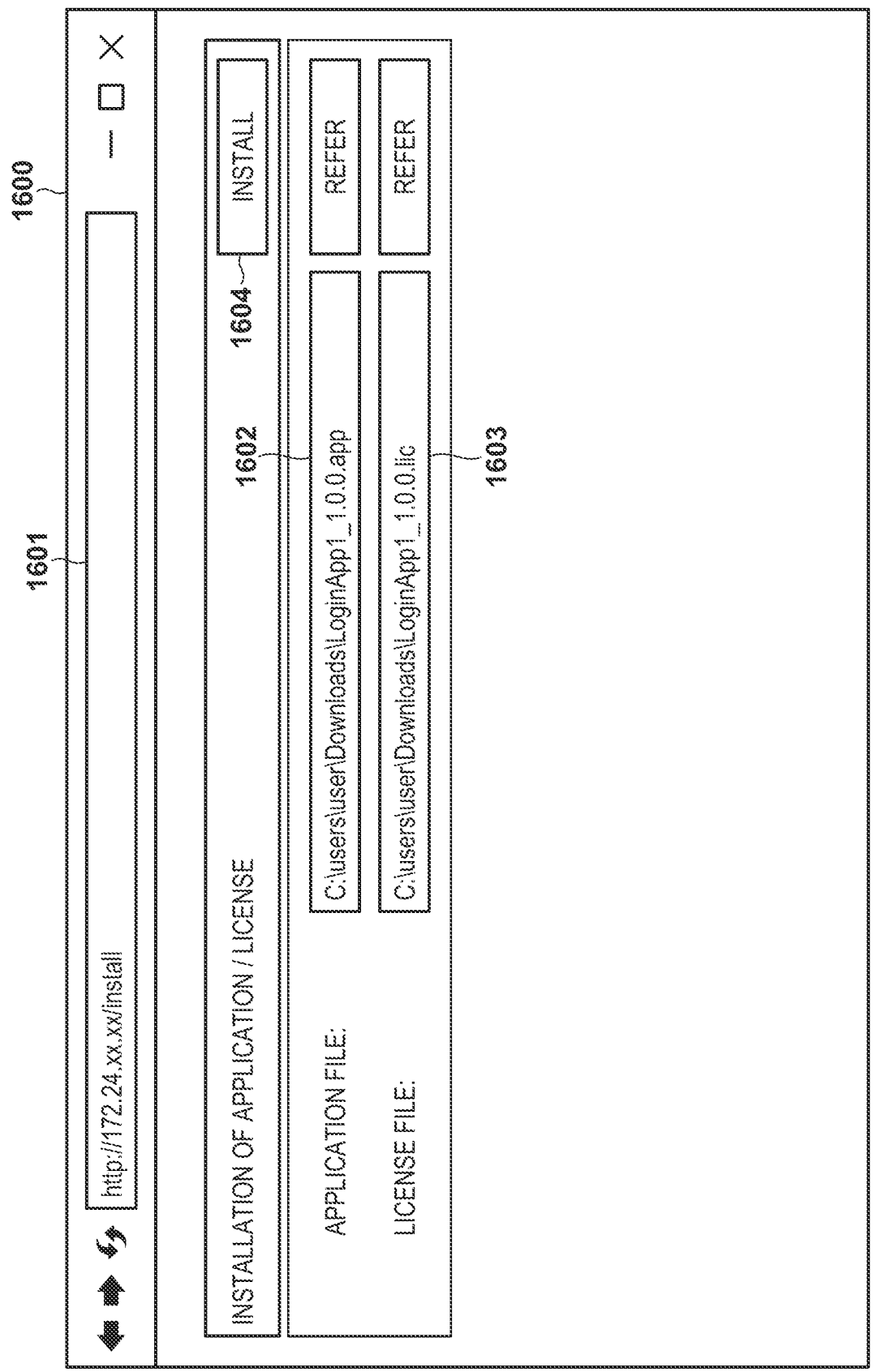

INFORMATION PROCESSING APPARATUS AND METHOD OF CONTROLLING THE SAME WITH AN APPLICATION REINSTALLATION FEATURE

BACKGROUND OF THE INVENTION

Field of the Invention

The present invention relates to an information processing apparatus that executes, for example, an installation of an application, and a method of controlling the same.

Description of the Related Art

In recent years, a system for installing an application, which is from a server apparatus via an external network, for expanding a function on an image processing apparatus (for example, an MFP (Multifunction Peripheral)) connected to an internal network such as a LAN (a Local Area Network) from an information processing apparatus (for example, a PC (Personal Computer)) is known. In such a system, a technique for avoiding failure to install an application is proposed. According to Japanese Patent Laid-Open No. 2018-33005 (PTL 1), if there is a failure in installation due to a physical obstruction such as a malfunction or a paper jam of the image processing apparatus, a re-install is performed when the obstruction is resolved, and the application is installed.

However, installation may also fail in a case where the cause of an installation failure is not due to an obstruction of the MFP but is due to a setting or a network configuration of the MFP, for example, and it is not possible to download an application from a server apparatus. In such a case, installation success is not expected even if re-install is attempted as in PTL 1. As a reason for failure, specifically there is a case where an MFP is an old model and thus there is no actual proxy setting for accessing an external network, a case where a proxy setting of a device is not set correctly, or the like.

If installation fails for a reason as described above, it is possible to or cause installation to succeed by another method such as retrying after reviewing a network setting of the MFP or attempting installation by another means without going through a network, but these methods need to be performed by a user, and they are troublesome for the user. In addition, retrying installation by these methods may be difficult, depending the user's technical knowledge or proficiency.

SUMMARY OF THE INVENTION

Accordingly, the present invention provides an information processing apparatus for, if a download of an application to an image forming apparatus fails, executing re-installation of the application with the intermediation of the information processing apparatus which is connected to the image forming apparatus, and a method of controlling the same.

The present invention has the following configuration.

According to an aspect of the present invention, there is provided an information processing apparatus, comprising: a determination unit configured to determine a result of installation processing of an application from an external server that stores the application to a device; a download unit configured to download the application from the external server if it is determined by the determination unit that the external server cannot be referred to; and a transmission unit configured to transmit, to the device, an installation instruction for the application together with location information indicating a download destination to which the application was downloaded by the download unit.

According to another aspect of the present invention, there is provided an information processing apparatus, comprising: a reception unit configured to receive, from a device, an installation result of an application in response to an installation instruction transmitted to the device; and a transmission unit configured to, if the installation result indicates failure to refer to a designated external server, download the application from the external server and store the application in a storage destination, and transmit to the device an installation instruction designating the storage destination.

By virtue of the present invention, if a download of an application to an image forming apparatus fails, an information processing apparatus connected to the image forming apparatus is made to intermediate, and re-installation of the application is executed.

Further features of the present invention will become apparent from the following description of exemplary embodiments with reference to the attached drawings.

BRIEF DESCRIPTION OF THE DRAWINGS

FIGS. 6A and 6B show views illustrating a GUI display of a device registration application.

FIG. 7 is a view illustrating a data structure of information of an application to be installed.

FIG. 8 is a view illustrating a data structure of device information of an MFP.

FIG. 9 is a view illustrating an installation processing flow of a device registration application.

FIG. 12A-1 and FIG. 12A-2 show a view illustrating an installation processing flow of a device registration application.

FIG. 13B-1 and FIG. 13B-2 are a view illustrating an installation processing flow of the device registration application.

FIG. 14 is a view illustrating a data configuration of a customization setting file.

FIG. 16 is a view illustrating a remote UI display of an MFP 101.

DESCRIPTION OF THE EMBODIMENTS

Description is given below for an embodiment of the present invention, based on the drawings. Note that the following embodiments are not intended to limit the present invention, and that not all of the configurations that are described in the embodiments are necessarily required with respect to the means to solve the problems according to the present invention.

First Embodiment

[System Configuration]

Figure 1:
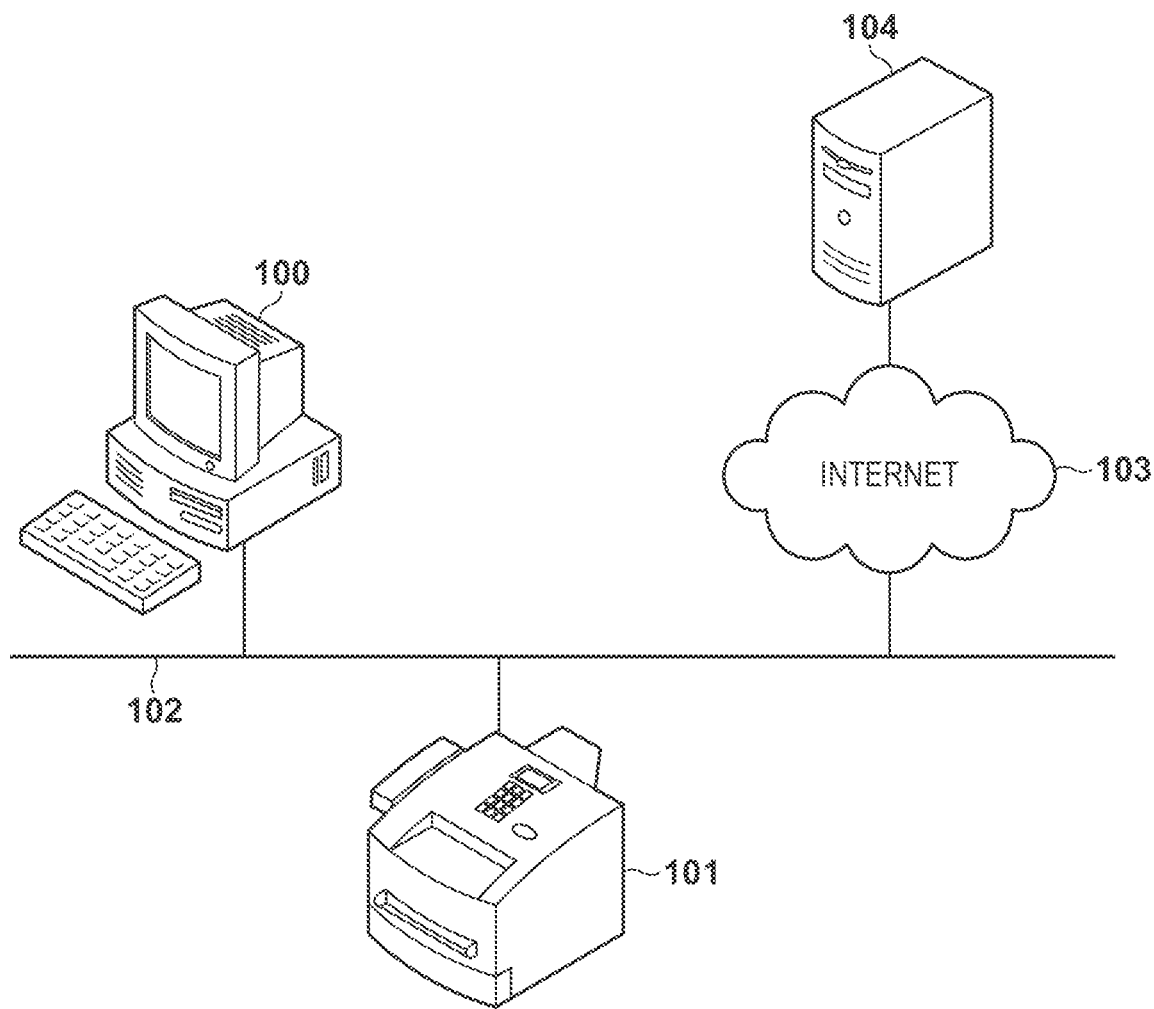
FIG. 1 is a view illustrating a configuration of a system.

FIG. 1 is a view illustrating an overall configuration of an information processing system according to an embodiment of the present invention. In the information processing system, a PC 100 and an MFP 101 are connected via a LAN 102, and the LAN 102 is connected to the Internet 103. An application server 104 is connected to the Internet 103. The PC (a personal computer or a computer) 100 is an example of an information processing apparatus, is installed with a predetermined OS (Operating System, not shown), and is installed with various applications (not shown) for executing specific functional processing. The MFP 101 is an example of an image processing apparatus (or an image forming apparatus), and is provided with a print function, a scanner function, a file transmission function, a fax function, a copy function, or the like. The MFP 101 is provided with a platform for executing an application program (hereinafter referred to as an application) written in Java (registered trademark) or the like, for example. It is possible to execute an installed application on the platform. An installer for installing an application may be installed in the MFP 101 in advance, for example. In response to a request from a client such as the PC 100 or the MFP 101, the application server 104 provides an installation file for the application which is operated by the MFP 101. Seen from the PC 100, the application server 104 is an external unit, and thus may be referred to as an external server. As is described later, the PC 100 may have a server function, and this may be referred to as an internal server. In all embodiments that are described here, communication settings of the PC 100 are performed correctly, and the PC 100 can obtain an application program file provided by the application server 104 via a Web browser or the like, for example. The PC 100 can also function as a server, and in this case the MFP 101 can obtain an application program file that the PC 100 provides.

[Hardware Configuration (PC)]

Figure 2:
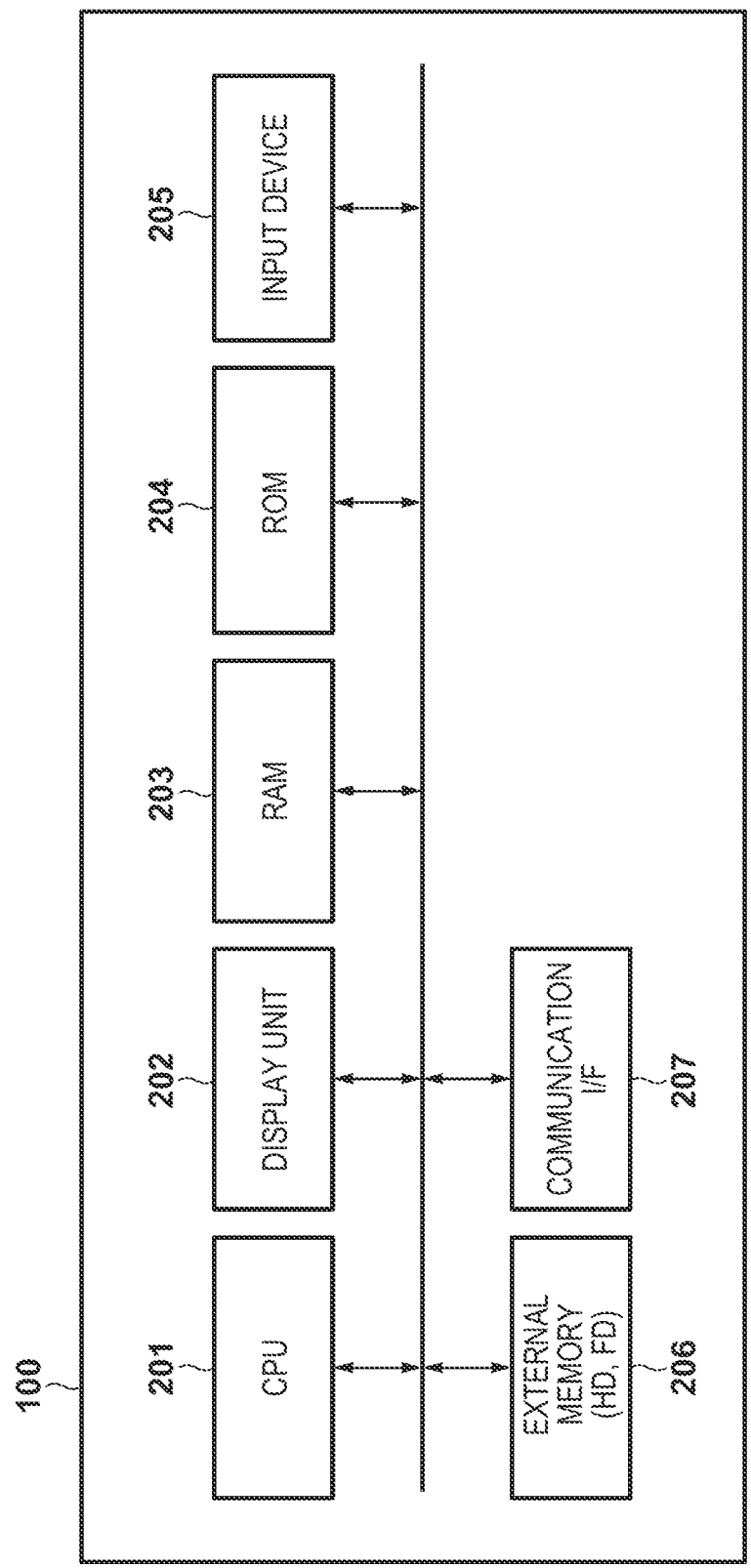
FIG. 2 is a view illustrating a hardware configuration of a PC.

FIG. 2 is a view illustrating a hardware configuration of the PC 100 illustrated in FIG. 1. In FIG. 2, an input device 205 for receiving input of a user operation, such as a keyboard or a pointing device, is provided. A display unit 202 for providing visual output information feedback to a user is also provided. A storage device RAM 203 for storing various programs or execution information for the present embodiment, an external memory 206 such as an HDD (hard disk drive) or an FDD (floppy disk drive), and a ROM 204 are also provided. A communication interface device (a communication I/F) 207 for performing communication with an external device, and a CPU 201 for executing a program are also provided. The CPU 201 can realize a below-described device registration application or the like by executing a program. Note that a form of a connection with a peripheral device may be wired or wireless. The PC 100 connects to the MFP 101 and the application server 104 via the communication I/F 207. Note that the application server 104 may have a hardware configuration similar to that of the PC 100.

[Hardware Configuration (MFP)]

Figure 3:
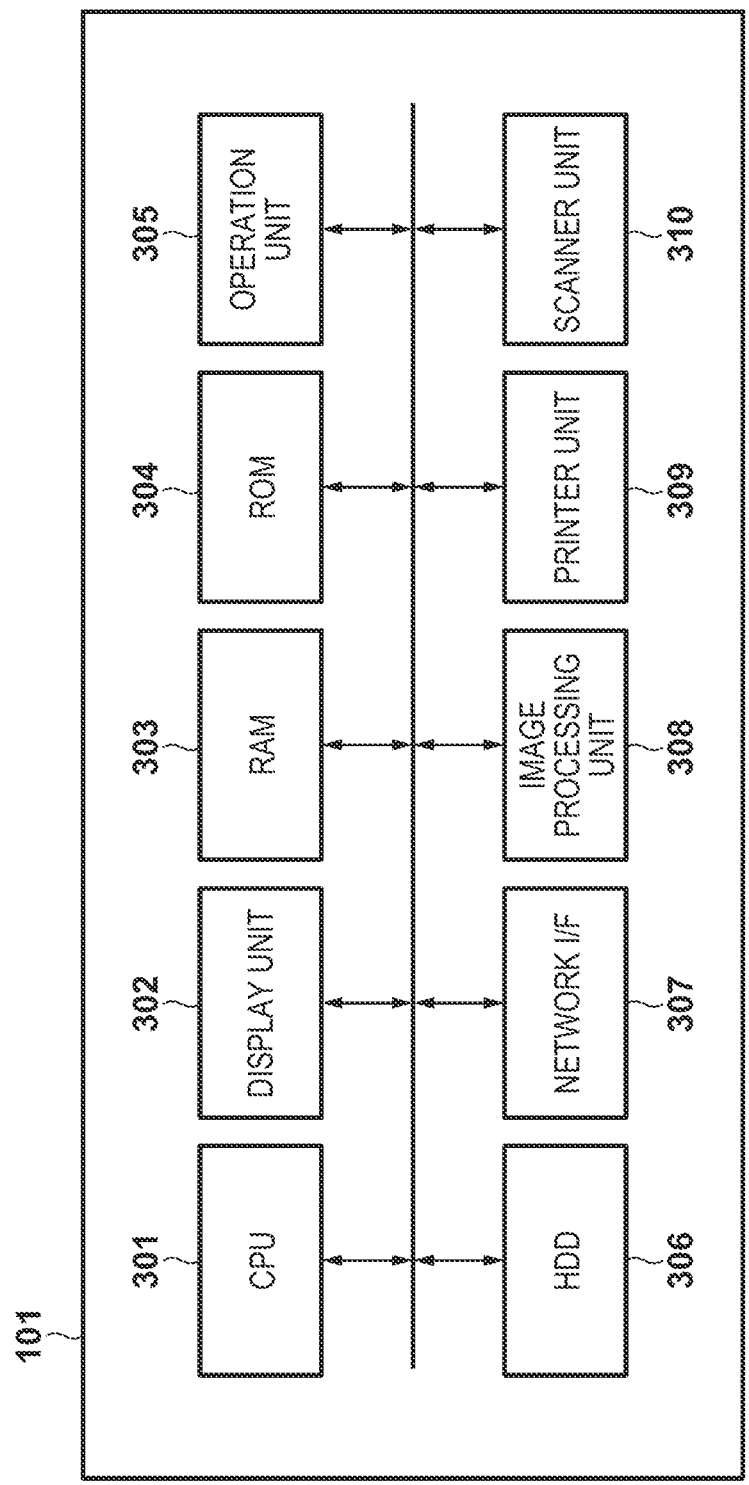
FIG. 3 is a view illustrating a hardware configuration of an MFP.

FIG. 3 is a block diagram for describing a hardware configuration of the MFP 101 according to an embodiment. A CPU 301, a display unit 302, a RAM 303, a ROM 304, an operation unit 305, an HDD 306, a network I/F 307, an image processing unit 308, a printer unit 309, and a scanner unit 310 are connected via a system bus (not shown). The MFP 101 is also connected to the LAN 102 via the network I/F 307. By this, communication by a communication protocol such as HTTP and TCP/IP through the LAN 102 is possible.

The CPU 301 executes a boot program of the ROM 304 to deploy an OS and a control program stored in the HDD 306 to the RAM 303, and comprehensively controls the MFP 101 based on this control program. The RAM 303 provides a work memory for the CPU 310 to operate, and also provides an image memory for temporarily storing image data. The boot program for the MFP 101 and various data are stored in the ROM 304. The operation unit 305 has an interface or various hard keys for accepting an operation with respect to the display unit 302 which has a touch panel function, and accepts information of an operation by a user to perform control for executing processing with respect to the operation. The HDD 306 is a hard disk drive, and stores the OS, various programs, and image data.

The network I/F 307 connects to the LAN 102, and performs input/output of information via a network. The image processing unit 308 performs image processing such as rotation, color conversion, or image compression/decompression processing on image data inputted from the scanner unit 310 or image data to be outputted to the printer unit 309. The printer unit 309 accepts image data that has been processed by the image processing unit 308, and controls printing in accordance with attribute data that is attached to the image data. The scanner unit 310 reads an image on an original, and creates image data of the image. Note that description is given in the embodiment by taking an MFP, which is capable of GUI (Graphical User Interface) display using the display unit 302 and the operation unit 305, as an example, but an information processing apparatus such as a general-purpose computer may be employed instead of the MFP 101.

[Software Configuration Diagram (Device Registration Application 400)]

Figure 4:
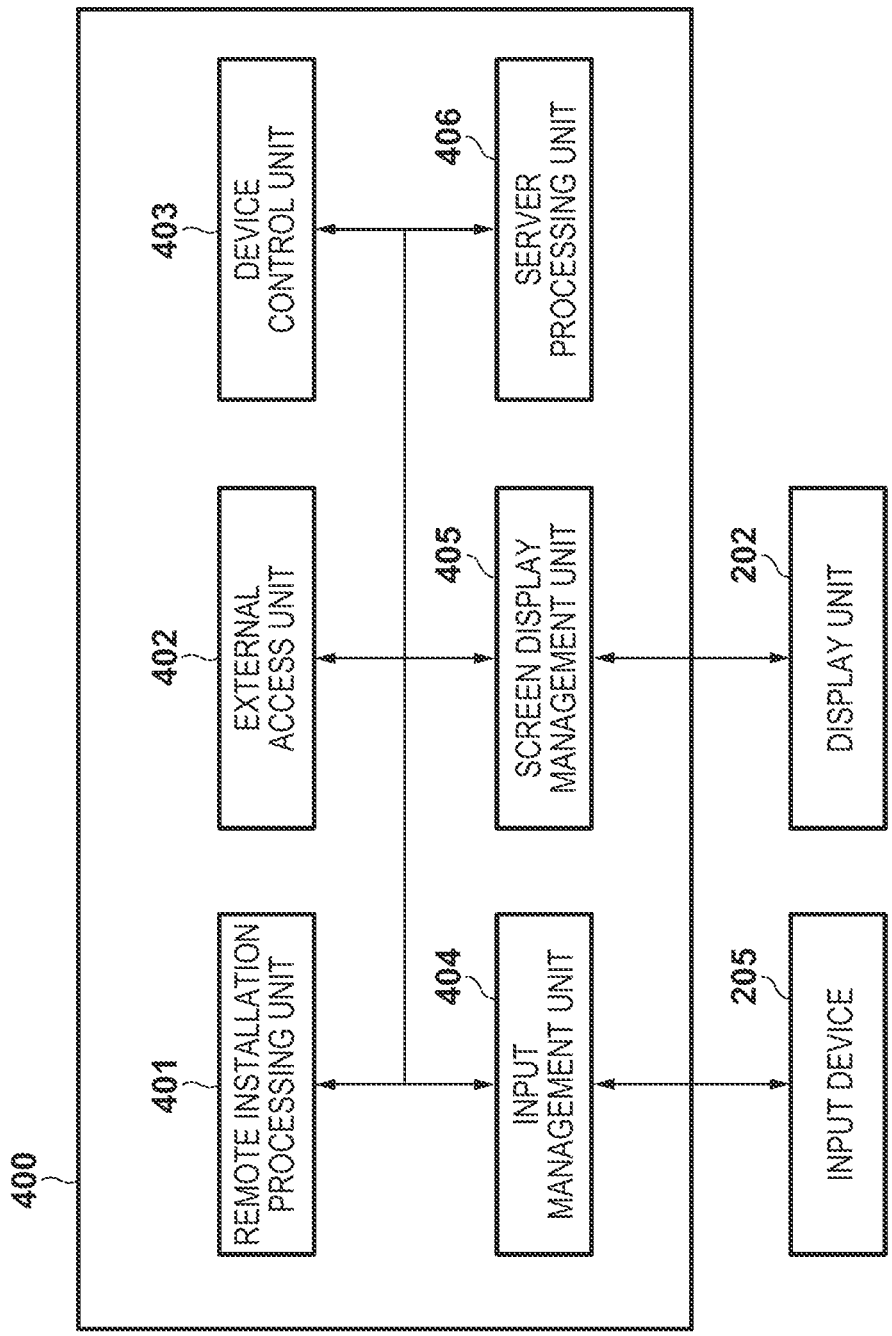
FIG. 4 is a view illustrating a software configuration of a device registration application.

FIG. 4 is a view illustrating an example of a software configuration of a device registration application 400 of the PC 100. The device registration application 400 operates on the PC 100, and in particular is loaded into the RAM 203, and is executed by the CPU 201. The device registration application 400 provides a function for remotely installing an application onto the MFP 101. The device registration application 400 is provided with a remote installation processing unit 401, an external access unit 402, a device control unit 403, an input management unit 404, a screen display management unit 405, and a server processing unit 406.

The remote installation processing unit 401 performs overall processing for executing an installation of an application to the MFP 101. Specifically, a connection is made to the application server 104 via the external access unit 402, and information of an application to install is obtained. Based on the application information, an instruction is made to the screen display management unit 405, and a GUI (Graphical User Interface) for selecting an application to be installed is displayed. In addition, to install an application that has been designated by a user, an instruction to install the application to the MFP 101 is made via the device control unit 403. Specifically, a download destination of an installation file for the application to install is designated based on the information obtained from the application server 104, and execution of this installation is requested.

The external access unit 402 executes processing relating to communication with an external device that is connected to the PC 100 via the LAN 102. The external access unit 402 accesses the application server 104, for example, and obtains information of an application to install to the MFP 101. In addition, data output is executed when providing a file to the MFP 101 with the PC 100 as an installation file server.

The device control unit 403 performs control relating to the MFP 101.

Specifically, obtainment of information (information 801 indicated in FIG. 8 which is described later) of an application to be installed on the MFP 101 and an instruction to install to a device (or an installation request) is executed. An installation instruction is a command for executing installation, and is prepared as a Web interface, for example, and is executed by the Web interface being called.

The input management unit 404 detects an operation of the input device 205 by a user via a GUI of the device registration application 400 which is displayed by the screen display management unit 405, and obtains operation information of the user.

The screen display management unit 405 performs screen display control such as displaying a GUI of the device registration application 400 or accepting a user operation with respect to the GUI.

The server processing unit 406 executes configuration processing necessary for the PC 100 to operate as a server, such as communication port registration processing, firewall exception registration, and cancellation of such. A server module such as an HTTP server or a FTP server may be included in the server processing unit 406.

[Software Configuration Diagram (Applications Installed on the MFP 101)]

Figure 5:
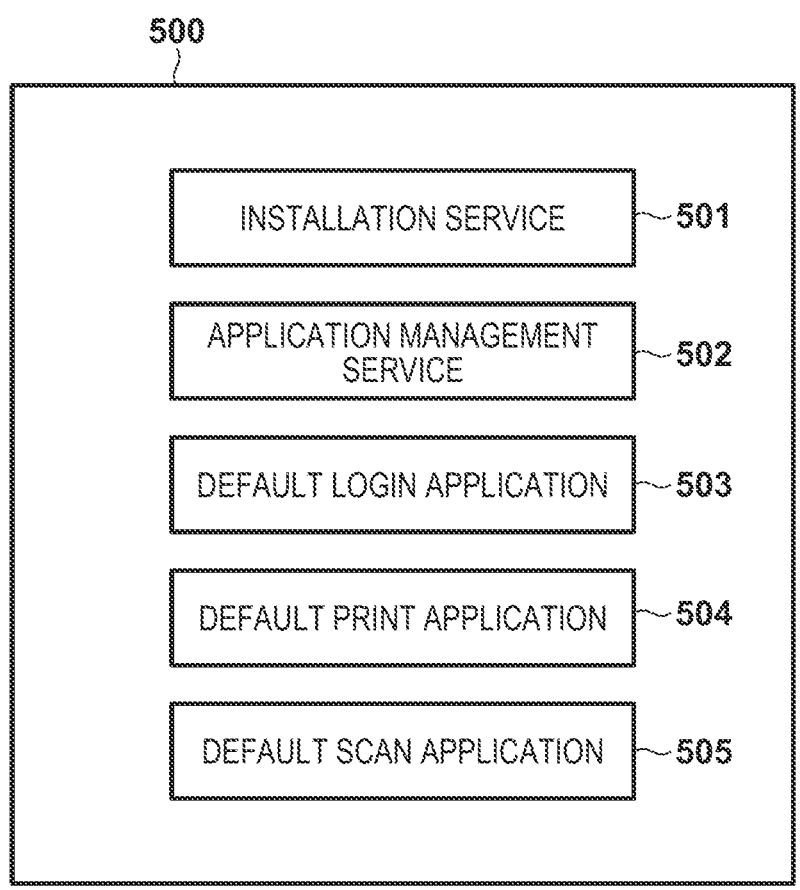
FIG. 5 is a view illustrating a configuration of applications installed on an MFP.

FIG. 5 is a view illustrating an example of an application configuration of the MFP 101 according to an embodiment. These applications indicate applications installed on the MFP 101, and each application is stored in the HDD 306, and at a time of execution is loaded into the RAM 303, and executed by the CPU 301. In the example in accordance with the present view, these applications are configured by an installation service (also referred to as an installation unit) 501, an application management service (also referred to as an application management unit) 502, a default login application 503, a default print application 504, and a default scan application 505, and these are installed in the MFP 101 in advance. In addition to these, it is possible to additionally install an application provided by the application server 104. It is also possible to additionally install an application for realizing a desired function, such as an application (not shown) created by development vendor, for example.

The installation unit 501 controls installation of an application to the MFP 101. The installation unit 501 executes installation of an application in accordance with an installation instruction from the PC 100 which is connected to the MFP 101 via the network I/F 307. Installation files (an application file and a license file) designated by an installation instruction are downloaded from designated download sources and installed.

In the installation processing, the installation unit 501 checks whether to install an application program in accordance with the license file (not shown) associated with the application file. For example, the installation unit 501 confirms whether installation to the device which is an installation destination (for example, the MFP 101) is supported, by comparing a device ID recited in the license file with a device ID of the MFP 101. In addition, the installation unit 501 confirms the validity of a license from a validity period stated in the license file. For example, if it is possible to install an application to be installed onto a target device and the license is valid, then the application is installed onto the MFP 101, for example, which is the target device. An application to be installed onto the MFP 101 is written in a language such as Java (registered trademark) for example, and in such a case, a platform for executing an executable file for an application written in Java (registered trademark) or the like is provided in the MFP 101.

The application management unit 502 manages applications which have been installed onto the MFP 101. For example, a request for installed application information is accepted from the PC 100, and information (for example, information 800 of FIG. 8 which is described later) of applications that are installed on the MFP 101 is replied to the PC 100. In addition, at a time of an installation, an application to be installed is saved in the HDD 306 via the application management unit 502.

The default login application 503 provides an authentication function when user authentication on the MFP 101 is necessary. For example, a login screen is displayed on the display unit 302 of the MFP 101, and authentication is performed in accordance with authentication information (or user information) of a user that includes a login ID and a password or the like that are inputted by the user. Accordingly, in accordance with the authority of the user, whether to permit operation by the user is controlled.

The default print application 504 is a standard application for using the printer unit 309 to print. The default scan application 505 is a standard application that provides a function for performing a scan using the scanner unit 310.

[Device Registration Application GUI]

Figure 6A:
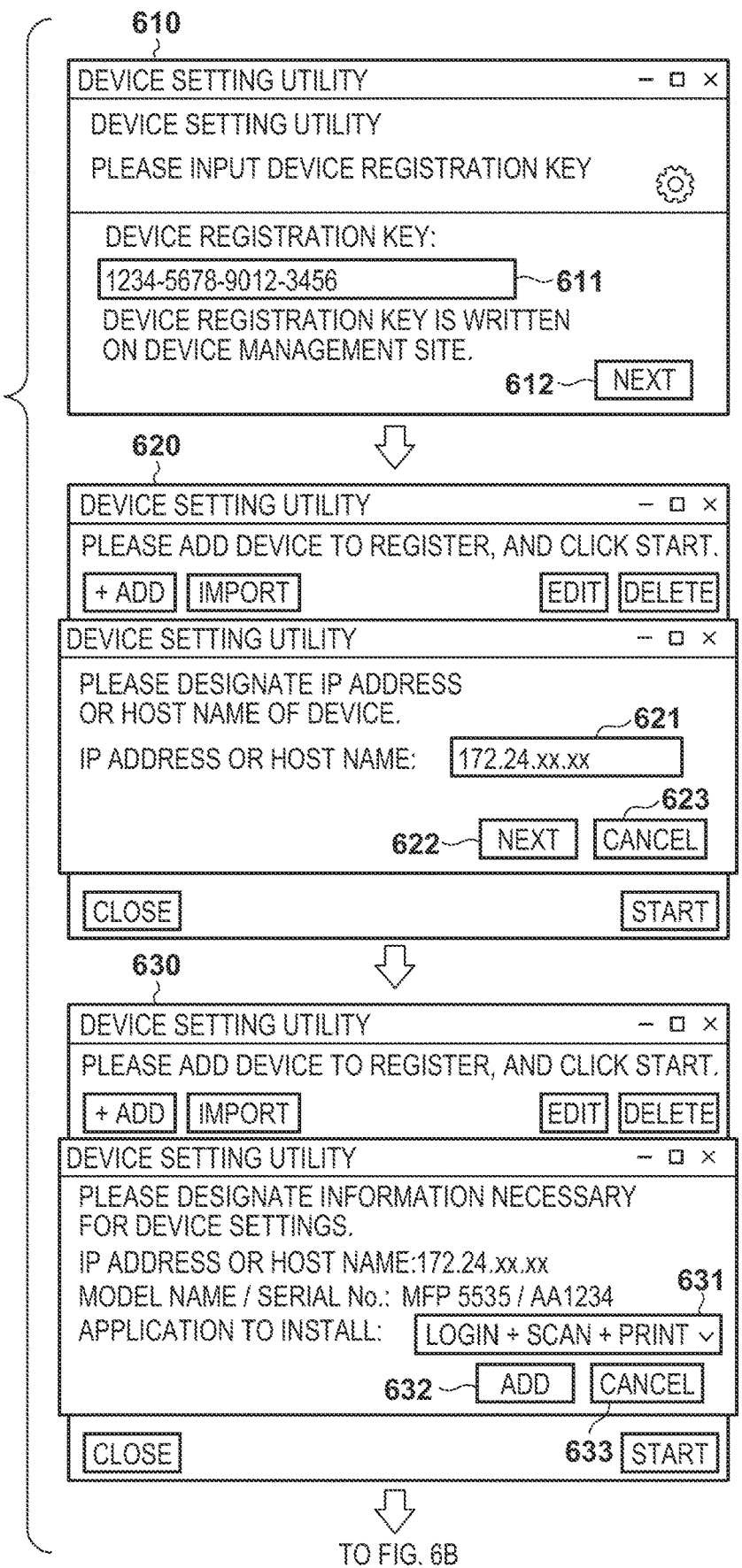

FIGS. 6A and 6B is an example of user interface (UI) screens displayed by the device registration application 400 of the PC 100. In an installation that uses the device registration application 400, a user can install an application to the target the MFP 101 by designating the MFP 101 which is the target by inputting an IP address or a host name, and selecting an application to install. FIGS. 6A and 6B, a flow of installation processing by the device registration application 400 is illustrated in accordance with an example of a GUI.

A registration key input screen 610 is an initial screen of the device registration application 400, and is a screen for designating a device registration key. A device registration key is key information for specifying a device when managing devices by a device management server (not shown) or the like, for example, and it is used to perform management by linking the MFP 101 which is the installation target with the device registration key. A device registration key is inputted to a device registration key field 611, and a next button 612 is operated (such as by a touch or a click, for example) and executed by a user to thereby have a transition to a subsequent IP address designation screen 620. Note that a device registration key is not essential in the present embodiment. In such a case, a transition is made to the IP address designation screen 620 by the operation of the next button 612 without the input of a device registration key.

The IP address designation screen 620 is a screen for designating the MFP 101 to be the target of installation by the input of an IP address or a host name. An IP address or a host name is designated by an IP address field 621 of the IP address designation screen 620, and a next button 622 is operated. Processing is canceled if a cancel button 623 is operated. In response to operation of the next button 622, the device registration application 400 obtains device information of the MFP 101 and information of the application to install. The device information of the MFP 101 indicates basic information of the MFP 101 which corresponds to the designated IP address or host name, information of installed applications, or the like (the information 800 of FIG. 8 which is described later). The installed application information indicates information such as a download source (a URL) of the application to install, an application name, and a version (information 700 of FIG. 7 which is described later). Configuration may be taken to display an animation or the like which indicates that processing is underway in a case where time is required to obtain information.

A screen 630 is an application selection screen, and a user selects an application to install in accordance with a combo box 631. The combo box 631 arranges, in a list form, combinations of applications to install (packages), such as "login+scan+print" for installing all of the login application, the print application, and the scan application; "login+print" (not shown) for installing the login application and the print application; and "scan" for installing only the scan application, for example. While a user can input text in the combo box 631, configuration may be such that only selection from a list is possible. In the present example, a state where "login+scan+print" has been selected is illustrated. When installation is started in this state, the three selected applications—the login application, the print application, and the scan application—are installed on the MFP 101. By selecting a target combination (a package) and operating an add button 632, the MFP 101 which has been designated is added as an installation target device. Note that addition of a designated MFP 101 is cancelled by an operation of a cancel button 633.

A screen 640 is a device list screen, and a list 641 of target devices for application installation is displayed. In this example, in response to the operation of the add button 632 of the application selection screen 630, the MFP 101 registered as an installation target by the processing for screens 610 to 630 is added to the list 641 as a target device field 642 and displayed. It is possible to register a plurality of MFPs 101 that are installation targets, and in this case, information for the MFPs 101 added to the list 641 is displayed. In the present example, in a state were two MFPs 101 have been added as target devices to the list 641, installation is started in accordance with execution of a start button 643.

A target device field 644 indicates that for an MFP which has IP address of "172.24.xx.xx" and which was in a "preparation complete" state in the screen 640, installation has started and the MFP has transitioned to an "installing" state. Another target device field 645 indicates that an MFP for the IP address "172.24.xx.yy" that was registered in accordance with processing on the screens 610 to 630 has entered a state of waiting for installation to be executed, and is in a "preparation complete" state. After installation has completed for the MFP of the target device field 644, installation is started for the MFP of the target device field 645. In the present example, installation is performed consecutively in this way, but installation may be performed in parallel.

[Application Information]

FIG. 7 is an example of application information 700 provided by the application server 104 which indicates the present embodiment, and is obtained by the device registration application 400 of the PC 100. The application information 700 is obtained from the application server 104 when the next button 622 of the IP address designation screen 620 of FIG. 6A described above is operated. Based on the obtained application information 700, the combo box 631 which includes installation target choices, is displayed on the application selection screen 630. In the present embodiment, while description is given for an example where the application information 700 is defined in a JSON (JavaScript Object Notation) format, there is no particular limitation to this format, and the application information 700 may be in another format.

Package information 701 defines one package (a combination of applications), and individual application information 702 defines information relating to one application. A package indicates a combination of one or a plurality of applications.

A package name 711 indicates a package name, and is displayed as a choice in the combo box 631 of the application selection screen 630 of FIG. 6A. In FIG. 7, two packages are exemplified: one with the package name "login+scan+print" 712, and one with the package name "login+print" 721.

An application name 712 indicates an application name, a version 713 indicates an application version, an ID 714 indicates an ID that uniquely indicates the application, a download source 715 indicates a download source of an application file, and a download source 716 indicates a download source of a license file for the application.

[Device Information]

FIG. 8 is device information 800 that is provided by the MFP 101 which indicates the present embodiment, and is obtained by the device registration application 400. The device information 800 is obtained from the MFP 101 when the next button 622 of the IP address designation screen 620 of FIG. 6A is operated. The device registration application 400 uses the obtained device information 800 in a determination such as whether to perform an installation when an installation is executed. In the present embodiment, an example is given where the device information 800 is defined in an XML (eXtensible Markup Language) format, but there is no particular limitation to this format, and the device information 800 may be another format.

The device information 800 includes basic information of the device, and installed application information 801. The basic information of the device includes an IP address 811 of the device, a serial number 812 of the device, a product name 813 of the device, and a device ID 814 that uniquely indicates the device. The installed application information 801 defines one installed application. Here, it is evident that "installation service", "application management service", "default login application", "default print application", and "default scan application" are already installed in the MFP 101 specified by the IP address 811.

The one installed application information 801 includes an application ID 821 that uniquely indicates the application, a version 822 of the application, a name 823 of the application, an installation day 824 of the application, and a state 825 of the application. Regarding the application "installation service" of FIG. 8, "Started" is indicated as the state 825 of the application, but this indicates that an installed application has been activated when the device information 800 is obtained. In contrast, if an application is installed but has not been activated, the state 825 is changed to indicate "Installed" or the like.

[Installation Flow for Device Registration Application (PC)]

FIG. 9 is a flowchart that indicates an example of installation processing for the device registration application 400 which indicates the present embodiment. As an overview of the processing, firstly the device registration application 400, which operates by being loaded into the RAM 203 of the PC 100 and executed by the CPU 201, instructs the MFP 101, and thereby an application is installed onto the MFP 101. If the MFP 101 cannot access the application server 104, the PC 100 accesses the application server 104 and downloads an installation file. Using the installation file on the PC 100, installation is retried by the MFP 101.

This processing is processing executed by the start of installation (operation of the start button 643 of FIG. 6B). In addition, this processing takes, as a target of installation, an application that has not been installed in the MFP 101, from among applications included in a package selected by a user (the package selected by the combo box 631 of FIG. 6A). Specifically, the device registration application 400 refers to the device information 800 and the application information 700 that was obtained in response to operation of the next button 622 on the IP address designation screen 620 of FIG. 6A. From among the applications 702 included in the package 701 selected by the user, which are included in the application information 700, an application that is not present as an application 801 installed on the device is taken as a target of installation. Applications for which the application ID 714 of the application information 700 is the same as the application ID 821 of the device information 800 and the version 713 is the same as the version 822 are determined to be the same application. This processing starts by the input management unit 404 of the device registration application 400 accepting operation of the start button 643, and the remote installation processing unit 401 starts processing by taking the application information 702 of the installation target as a target.

In step S901, the remote installation processing unit 401 sets an unprocessed application from among the applications 702 which are installation targets (in other words have been selected by a user) as a target of process. As a concrete method for specifying an unprocessed application, the application information 700 (FIG. 7) obtained from the application server 104 is compared with the device information (FIG. 8) obtained from the MFP, and an application which is only stated in the application information 700 is treated as an "unprocessed application". An application selected by a user from out of these unprocessed applications is treated as an installation target. Specifically, from out of applications selected by a user, an application that is indicated in the application information 700 but is not stated in the device information 800 corresponds to an unprocessed application. For example, there is "login application 1", "print application 1", "scan application 1", and the like.

In step S902, the MFP 102 is instructed to install an application specified as an installation target. Specifically, the remote installation processing unit 401, designating the download source 715 for the application file and the download source 716 for the license file of the application information 702 corresponding to the application that is the installation target, transmits an installation instruction to the MFP 101 via the device control unit 403. Note that information transmitted together with the instruction to install may be referred to as installation information. The device control unit 403 transmits, to the MFP 101, a command for executing installation, and waits for a response. Having received the installation instruction, the MFP 101 executes installation of the application based on the accepted installation information, and transmits a result thereof to the PC 100 which is the transmission origin of the installation instruction. For example, the MFP 101 accesses the download source included in the installation information to request the application file and the license file, and attempts installation if these are received. In accordance with a result of this, an installation result indicating success or failure and, as necessary, a reason for failure or the like are transmitted to the PC 100.

In step S903, the device control unit 403 receives the installation result as a return of the execution of the installation, and passes this result to the remote installation processing unit 401.

In step S904, the remote installation processing unit 401 refers to the installation result passed by the device control unit 403, and determines whether installation succeeded or not. Specifically, because a value returned as a result is referred to and it is determined whether this value indicates success, a determination is made as to whether the value corresponds to success from among values defined beforehand in accordance with integers or error codes. Here, in a case where installation success is determined the processing proceeds to step S913, and the installation result is displayed on a GUI. If failure (something other than success) is determined, the processing proceeds to step S905.

In step S905, the remote installation processing unit 401 refers to the value of the installation result, a determination is made as to whether a reason for failure is due to not being able to refer to the download source. Specifically, it is determined whether the installation result is a value that indicates an error for when the download source is not found or for when access is refused, for example. Here, if it is determined that the download source cannot be referred to, the processing proceeds to step S906, and in the case of an error due to another reason, the processing proceeds to step S912, and an error message is displayed on the GUI.

If it is determined that the download source cannot be referred to by the MFP 101, in step S906, the PC 100 attempts processing to access the download source, and download the files for the installation target. Specifically, the remote installation processing unit 401 instructs the external access unit 402 to download files by accessing the download source 715 for the application file and the download source 716 of the license file for the application information 702. In more detail, files of the download sources designated by the download sources 715 and 716 are read, written to a temporary region (for example, a temporary folder of the OS) of the PC 100, and saved as files.

In step S907, the remote installation processing unit 401 confirms a result of the download process by the external access unit 402 (confirming presence of saved files, and whether an error occurred during download), and if downloading succeeded the processing proceeds to step S908, and if failure is determined the processing proceeds to step S912 and an error message is displayed on the GUI.

Next, in the processing of step S908, the PC 100 executes configuration processing in order to operate as an installation file server. In more detail, the remote installation processing unit 401 instructs the server processing unit 406 to execute port registration processing for communication in which the PC 100 transmits data of an installation file in response to a request (also referred to as an obtainment request) from the MFP 101, and execute exception registration so that communication from the MFP 101 is not blocked by a firewall of the OS. Exception registration is registering a port for HTTP communication (for example, port number 5000) as an exception so that communication is not blocked by the firewall of the OS. By this, communication by the PC that uses port number 5000, for example, becomes possible and is not blocked by the firewall. In the present embodiment, a MFP can transmit a response such as "installation failure" to a PC with respect to a response from a PC, without registering an exception. However, when this exception registration is not executed, the MFP 101 is not able to request installation of an application from the PC 100 in response to an instruction from the PC as in processing described below (step S909).

In step S909, the remote installation processing unit 401, via the device control unit 403, instructs the MFP 101 to execute installation of the application again. At this point, there is a designation to refer to, as the download sources of the application file and the license file for the application that is the installation target, the files downloaded to the temporary folder on the PC 100 in step S906 as the storage destination of the application. For example, if port number 5000 is used in step S908 (if a URL for communication by HTTP is prepared), the download source is designated with http://<IP address of PC>: 5000/<file name>. The MFP 101, which received the installation instruction, downloads and installs the files in accordance with the installation instruction, and replies to the PC 100 with a result of the download and installation.

In step S910, the device control unit 403 receives the installation result as a return of the execution of the installation, and passes this result to the remote installation processing unit 401.

In step S911, the remote installation processing unit 401 refers to the installation result passed by the device control unit 403, and determines whether installation succeeded or not. Here, in a case where installation success is determined the processing proceeds to step S913, and the installation result is displayed on a GUI. If failure (something other than success) is determined, the processing proceeds to step S912.

Step S912 is transitioned to in accordance with a failure of installation processing or download of an installation file as described above, and, in accordance with details of a corresponding error, a message for the error is displayed in step S912. For example, if communication with the MFP 101 or the application server 104 fails, an HTTP status code is referred to, and in accordance with a corresponding error code, an appropriate message with a corresponding reason is displayed.

In step S913, the remote installation processing unit 401 passes a result of processing to the screen display management unit 405, and a result of installation is displayed. Specifically, a character string which indicates a result is displayed as a status of a corresponding device which was displayed on the list 641 of the device list screen 640 of FIG. 6B. A result that is displayed is a character string (not shown) that indicates success in the case of success, and, in the case of failure, a character string indicating failure and a character string indicating a reason and resolution method corresponding to the failure (not shown). Note that configuration may be taken to combine step S912 and step S913 into one step, and separately display a reason for failure together with discrimination of success or failure.

When installation processing by the above ends for one application, in step S914, the remote installation processing unit 401 determines whether there is an unprocessed application out of the installation target applications. Here, if there is an unprocessed application, the processing returns to step S901, and installation of the unprocessed application is processed. If complete for all applications, the installation processing indicated in the present view ends.

[Installation Flow of MFP 101]

Figure 10:
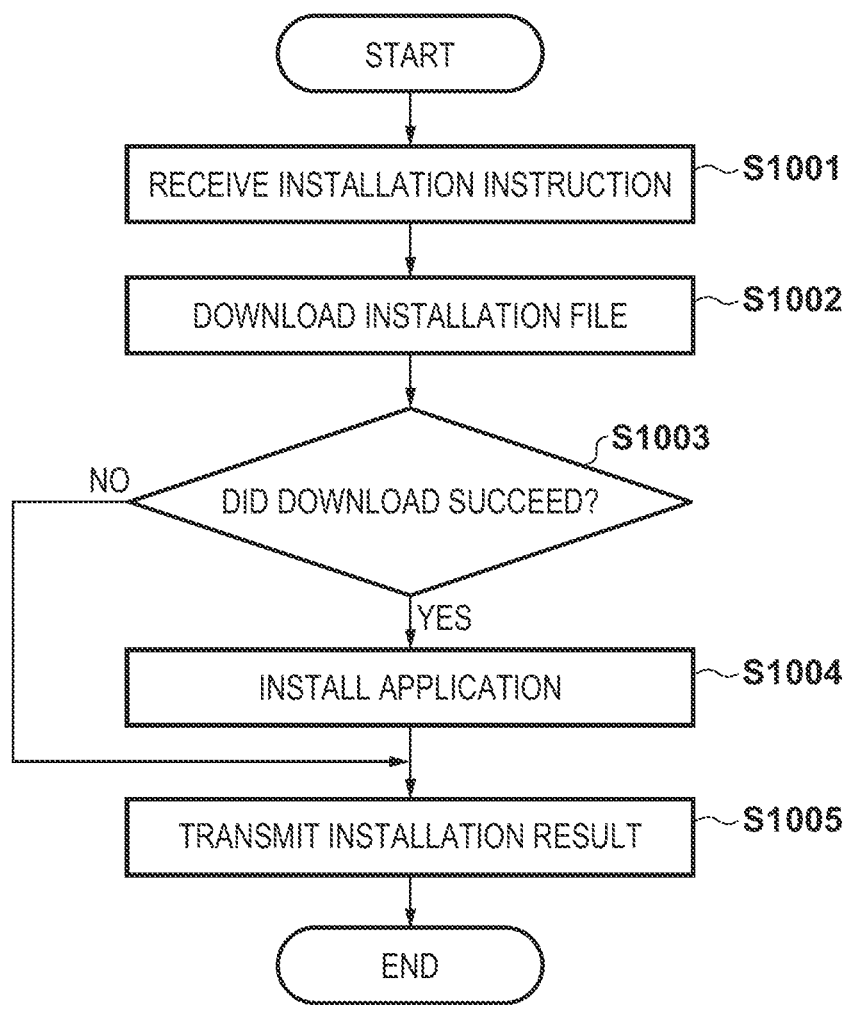
FIG. 10 is a view illustrating an installation processing flow of an MFP.

FIG. 10 is a flowchart that indicates an example of installation processing for the MFP 101 which indicates the present embodiment. This processing indicates processing for the installation unit 501 of the MFP 101 to download designated installation files and use the installation files to execute installation as processing starts upon accepting an instruction to execute installation by the PC 100 (step S902 or step S909 of FIG. 9 described above).

In step S1001, accepting communication from the PC 100, the installation unit 501 refers to the content of a command received by the PC 100, and specifies requested processing (installation) and a URL of an installation file. A URL can refer to an address, a destination, or location information designating a file, including a server and a folder. Of course, a destination or location information is not limited to a URL, and may be written in another way.

In step S1002, the installation unit 501 accesses the file designated by the URL to execute a download of the installation file. The designated download destination is accessed via the network I/F 307, and a file of the download destination is read and saved onto the HDD 306.

In step S1003, the installation unit 501 refers to a download result, and, in a case of determining download success, the processing proceeds to step S1004, and installation of the downloaded application is executed. In a case of failure, the processing proceeds to step S1005, and a result of download failure is transmitted to the PC 100. A case where the MFP 101 cannot access a URL designated to be a download destination can be considered as a reason for a download failure. For example, in a case of using a network configuration intermediated by a proxy server (not shown) for communication with an external unit, a proxy setting (a proxy server designation, and authentication information) for an external connection may be necessary. A download source cannot be referred to in a case where a proxy setting is not correctly set on the MFP 101, or a case where such a setting is itself not possible (is not prepared as a setting), or the like. In such cases, a return value indicating that the download source cannot be referred to is transmitted to the PC 100. In a case of also downloading a license file corresponding to an application, a result may be failure if download fails for either of a license file or an application file. In contrast, if installation succeeds for the application and the license, that installation succeeded is transmitted to the PC 100. If the license file is not necessary, success or failure may be determined by considering only the application file.

In step S1004, the downloaded installation file is used to execute installation of the application. In the installation processing, as described above (FIG. 5), a license file is referred to, a check of whether or not installation is possible is performed, and the application to be installed is saved to the HDD 306 via the application management unit 502.

In step S1005, the installation unit 501 transmits a result of the installation processing to the PC 100 via the network I/F 307.

By virtue of the embodiment described above, if the MFP 101 fails to download an installation file from the application server 104, the PC 100 downloads the installation file from the application server 104. The PC 100 itself becomes a surrogate application server, and instructs the MFP 101 to execute installation using the file. In this way, if the MFP 101 and the PC 100 are connected without going through a proxy, it is possible to avoid at least an installation failure due to a network setting for the MFP 101 and an application server.

Second Embodiment

In the installation processing described in the first embodiment, description was given for an example of causing the PC 100 to operate as a server for providing an installation file. Because the previously-described port registration or firewall exception registration processing apply changes to OS settings, a case where a user needs an administrator authority to execute the device registration application 400 can be considered. In a case of execution by a user who does not have an administrator authority, authentication (input of a user ID and a password, or the like) as an administrator user is requested, and processing is unable to continue if the user is not authenticated.

The present embodiment is made in consideration of such a configuration, and, using FIG. 11A, FIG. 11B, FIG. 15A, FIG. 15B, FIG. 15C, and FIG. 16, description is given below for an example of, in the case where the PC 100 is caused to operate as an installation file server and where a user doing the executing does not have the administrator authority, performing a notification that an administrator authority is necessary or performing a notification prompting manual installation by a user as an alternative option if authentication is impossible. Note that the same reference numeral is added for steps already described above, and description thereof is omitted.

[Installation Flow for Device Registration Application (PC)]

Figure 11A:
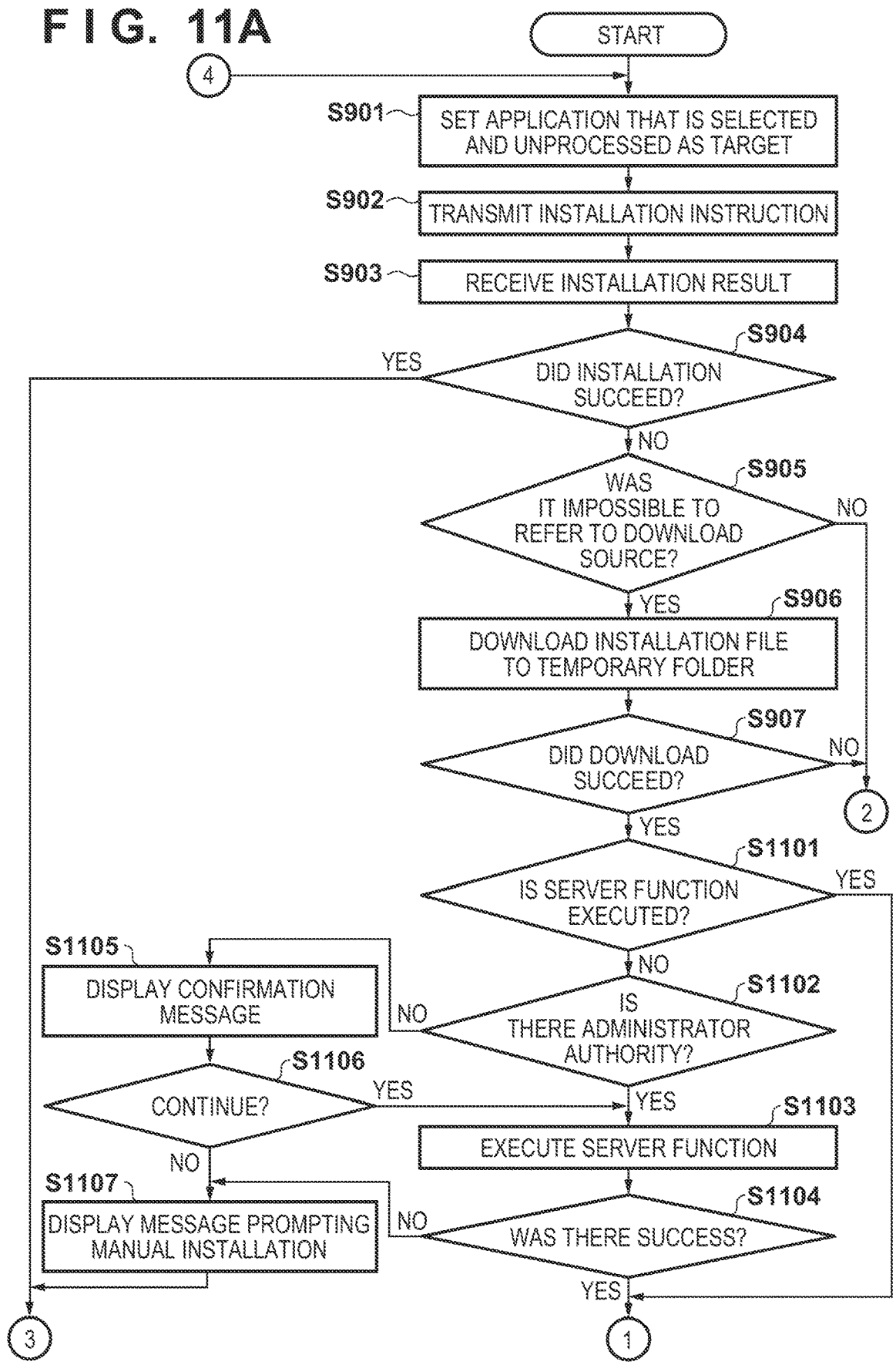
FIG. 11A is a view illustrating an installation processing flow of a device registration application.
Figure 11B:
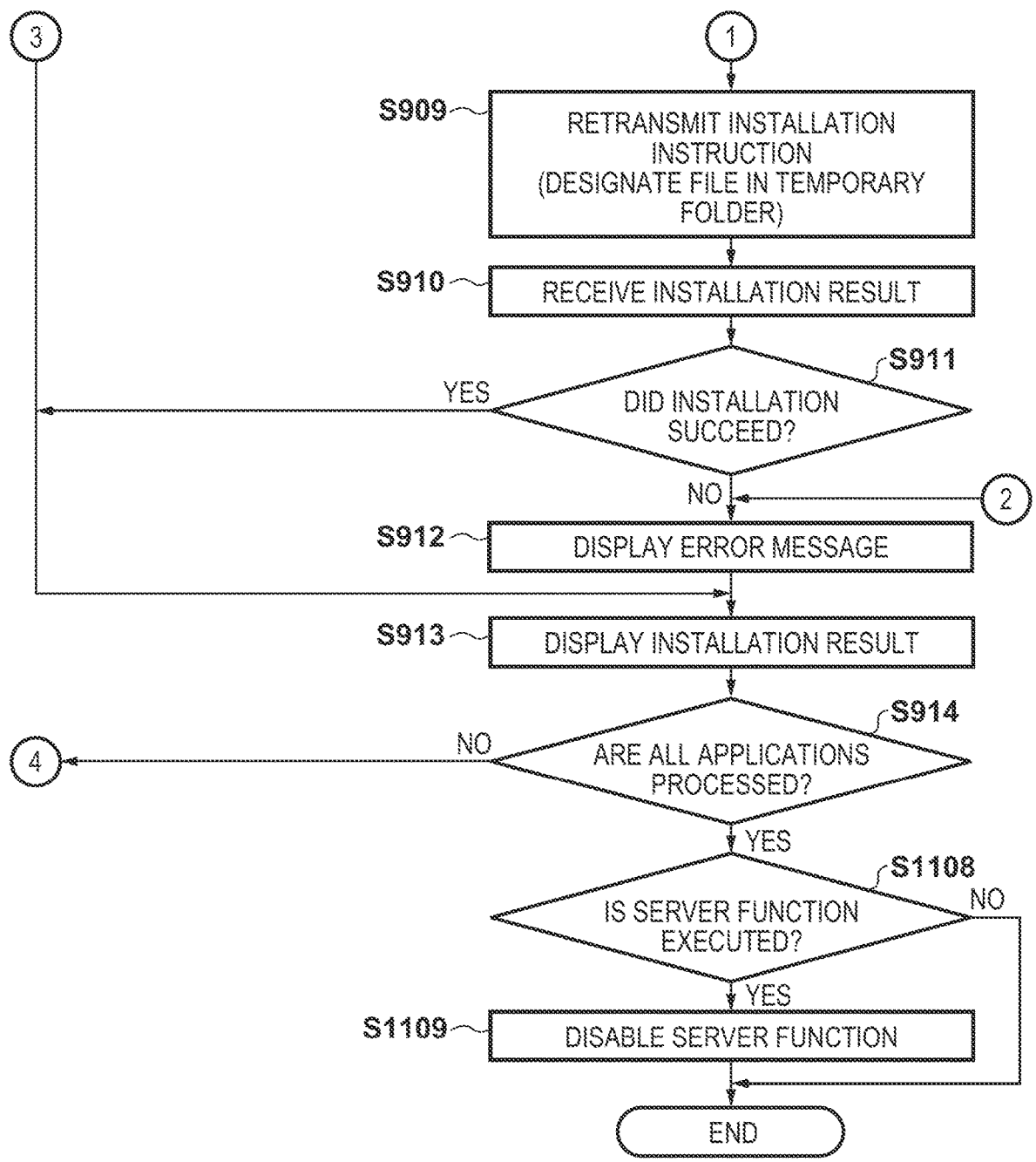
FIG. 11B is a view illustrating an installation processing flow of the device registration application.

FIG. 11A and FIG. 11B are flowcharts that indicates an example of installation processing for the device registration application which indicates the present embodiment. There is a difference with the first embodiment in that step S1101 through step S1107 are executed instead of step S908 of FIG. 9, and step S1108 and step S1109 are executed before the end of the processing. Note that, because FIG. 11A and FIG. 11B result from dividing one flow, they are referred to together as FIG. 11.

After determining that the PC 100 successfully downloaded the installation file in step S907, in step S1101, the remote installation processing unit 401 queries the server processing unit 406, and determines whether port registration and firewall exception registration processing for operation as a server have been executed. If this has been executed the processing proceeds to step S909, and the MFP 101 is instructed to execute installation again. If this has not been executed, the remote installation processing unit 401 refers to authority information of the user currently logged into the PC 100, and determines whether they are a user that has an administrator authority (step S1102). If it is determined that the user has an administrator authority, configuration processing for the PC 100 to operate as an installation file server is executed (step S1103). Because this processing is equivalent to step S908 of FIG. 9, detailed description is omitted. If the user does not have an administrator authority, the remote installation processing unit 401 instructs the screen display management unit 405 to display a message 1501 (FIG. 15A) for determining whether to continue after notifying the user that they need to be authenticated as a user having an administrator authority in order to continue (step S1105). The message 1501 notifies that authentication as a user having an administrator authority is necessary in order for the processing to continue.

After displaying the message 1501, the input management unit 404 accepts a user operation with respect to the message 1501 (step S1106), and if it is determined that the user operation is for the continuation of processing, the processing proceeds to step S1103, and it if it is determined not to continue the processing proceeds to step S1107.

If it is determined in step S1102 that the logged-in user has an administrator authority, configuration processing for the PC 100 to operate as an installation file server is executed (step S1103). This processing is equivalent to step S908 of FIG. 9.

In contrast, if it is determined in step S1106 that the user operation is for the continuation of processing, an authentication dialog 1502 (FIG. 15B) for causing the OS to be executed as the administrator user is displayed and the user is caused to input the authentication information (user ID and password) of the administrator user into the dialog before the processing of step S908 of FIG. 9 is executed. If there is a mistake in the authentication information or if authentication is canceled, there is an error and the processing is not executed. If authenticated succeeds, in other words upon confirming that a user corresponding to the authentication information has an administrator authority, the processing of step S908 of FIG. 9 is executed. In step S1104 if it is determined that execution of the server function succeeded from a processing result of step S1103, the processing proceeds to step S909, and if it is determined that it failed the processing proceeds to step S1107.

If the user operation did not select continuation of processing in step S1106, a message 1503 (FIG. 15C) displaying the location of the installation file saved to the temporary region of the PC 100 in step S906 and prompting a user to perform manual installation is displayed (step S1107). The message 1503 displays the location of the installation files (application file and license file) saved in the temporary region, and prompts a user to perform manual installation using these files.

In a case where a user performs installation manually, a remote UI (reference numeral 1600 of FIG. 16) of the MFP 101 is opened by the PC 100, and installation is executed from the remote UI 1600, designating the application file and the license file of the application to be installed. When designating a file, a storage location of a file displayed on the message 1503 is inputted at reference numeral 1602 or 1603 in accordance with a user operation.

Description is given in detail for the remote UI. The remote UI provides functionality for a status display (not shown) for confirming a status (whether an error has occurred, or a usage status such as that print processing is in progress) of the MFP 101, and for changing various settings or the like (not shown) of the MFP 101. The remote UI can be operated and displayed using a typical Internet browser (not shown).

The remote UI 1600 illustrates a state where the remote UI of the MFP 101 is being displayed from the Internet browser, and is a screen for executing installation of an application. Accordingly, it is also referred to as a remote screen.

An address 1601 is a text box that designates an http address, and indicates a state where an address for access to a screen for executing installation of an application onto the MFP 101 has been designated.

A text box 1602 is for designating an installation file of an application to install to the MFP 101, and a state where path information of a save destination of an application file saved on the PC 100 has been designated is indicated.

A text box 1603 is for designating a license file of an application to install to the MFP 101.

An install button 1604 is for executing installation, and installation to the MFP 101 is executed by designating the application file 1602 and the license file 1603 and operating the install button 1604. This concludes the description regarding the remote UI.

Description of FIG. 11 is returned to. After installation completes for all application (step S914), the remote installation processing unit 401 queries the server processing unit 406 to determine whether the server function has finished executing (step S1108). If it is determined that the server function has finished executing, the remote installation processing unit 401 instructs the server processing unit 406 and cancels the registered port and the firewall exception registration (step S1109).

By the present embodiment, by presenting a notification for a case where authentication by an administrator user is necessary or presenting a save destination of an installation file downloaded to the PC 100 even in a case where processing cannot be continued, it is possible to make countermeasures easier for a user and improve convenience, even in a case of requiring an administrator authority when causing the PC 100 to operate as an installation file server.

Third Embodiment

In a situation where there are a plurality of MFPs 101, after the above processing of FIG. 9 is performed on a first MFP 101, it is assumed that download of installation files fails for a second MFP 101 similarly to for the first MFP 101. In the processing of the above embodiments, even if an installation file is downloaded to the temporary region of the PC 100, at a time of installation processing for the second MFP 101, similar processing (FIG. 9) must be executed, and this is inefficient.

For the present embodiment, description is given for an aspect where, if an installation file has been downloaded to the temporary region of the PC 100, the downloaded installation file is also used to perform installation for a second or subsequent MFP. Note that the same reference numeral is added for steps already described above for FIG. 9 and FIG. 11, and description thereof is omitted.

[Installation Flow for Device Registration Application (PC)]

Figures 1, 12A:
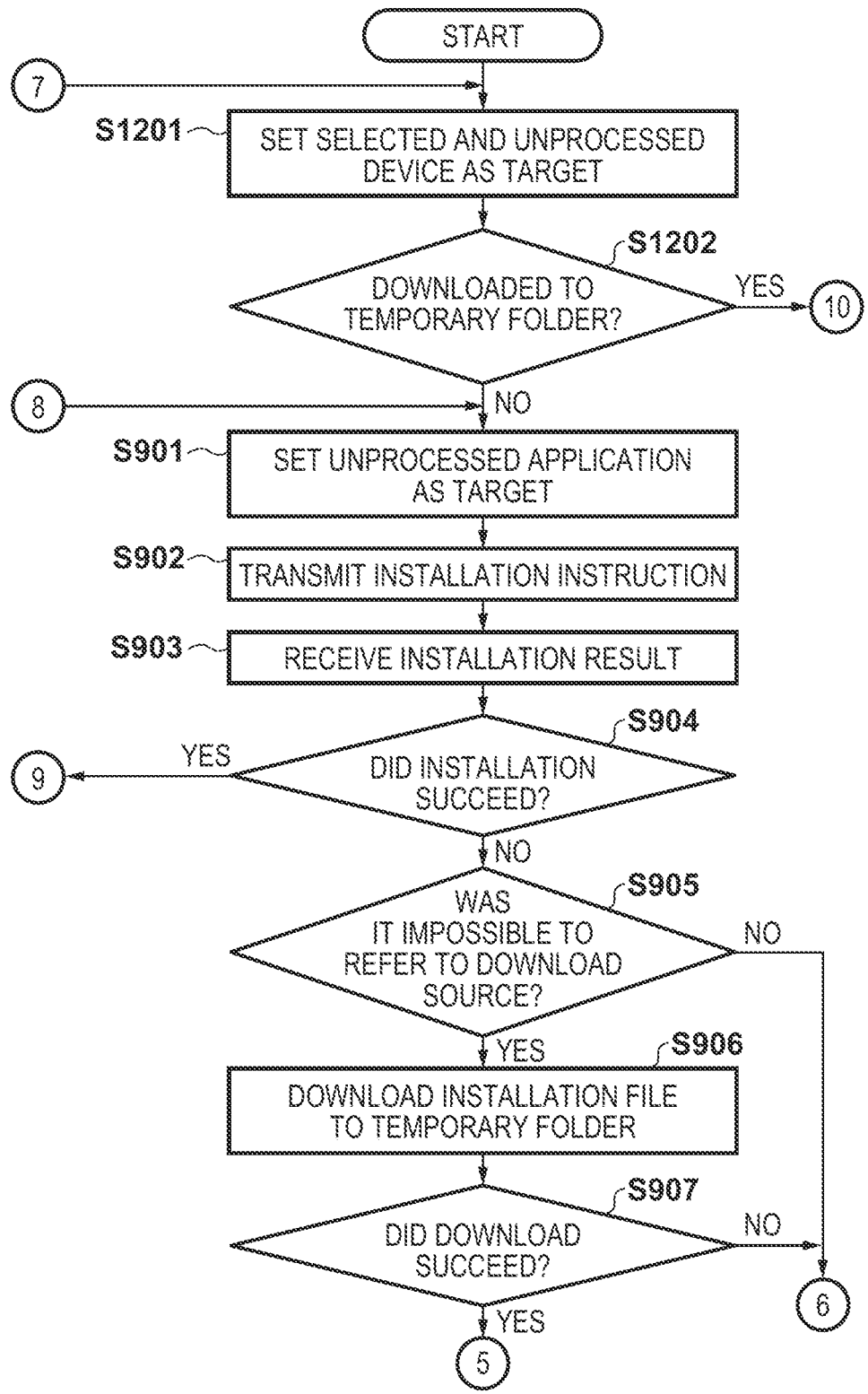
Figures 2, 12A:
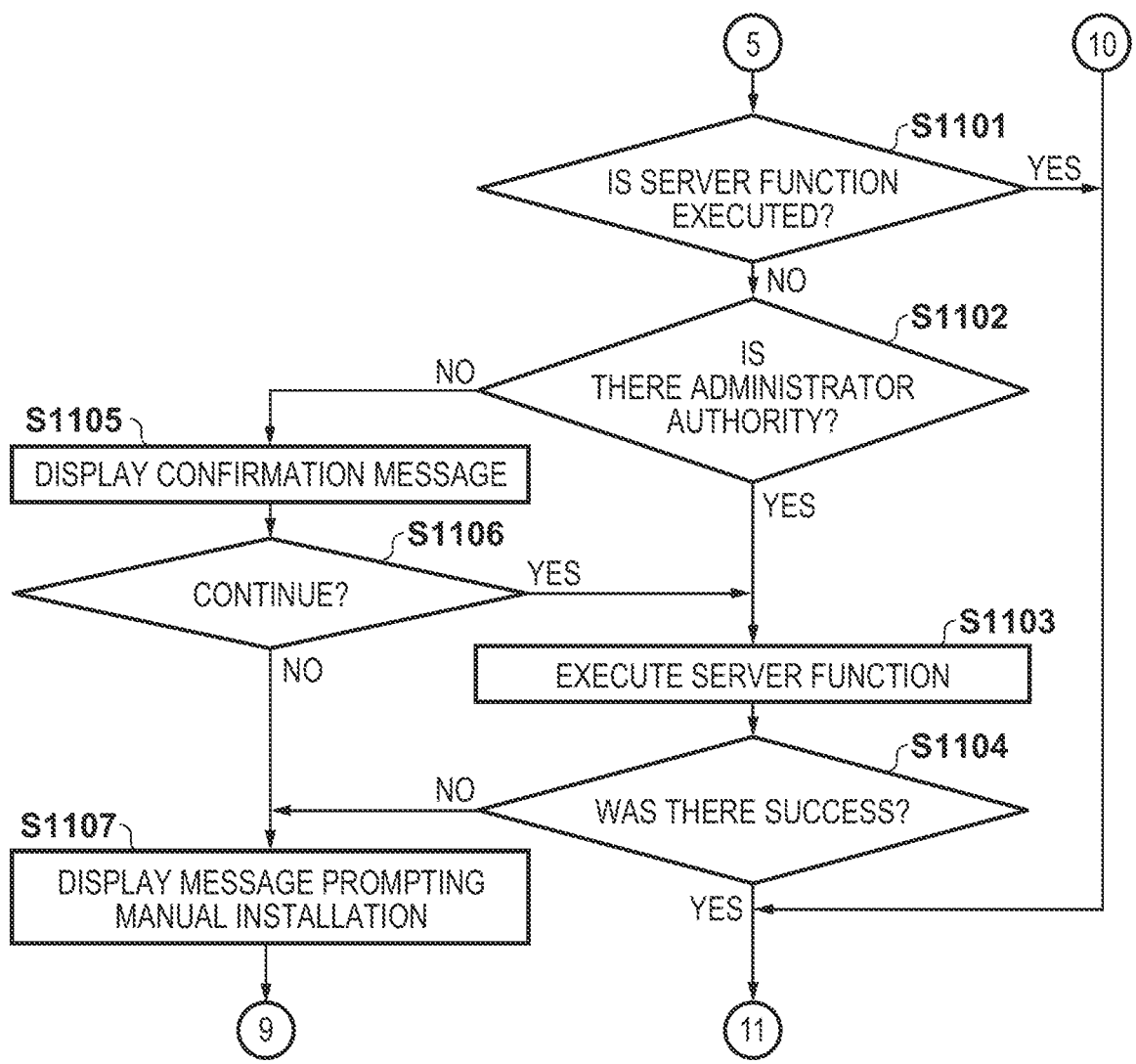
Figure 12B:
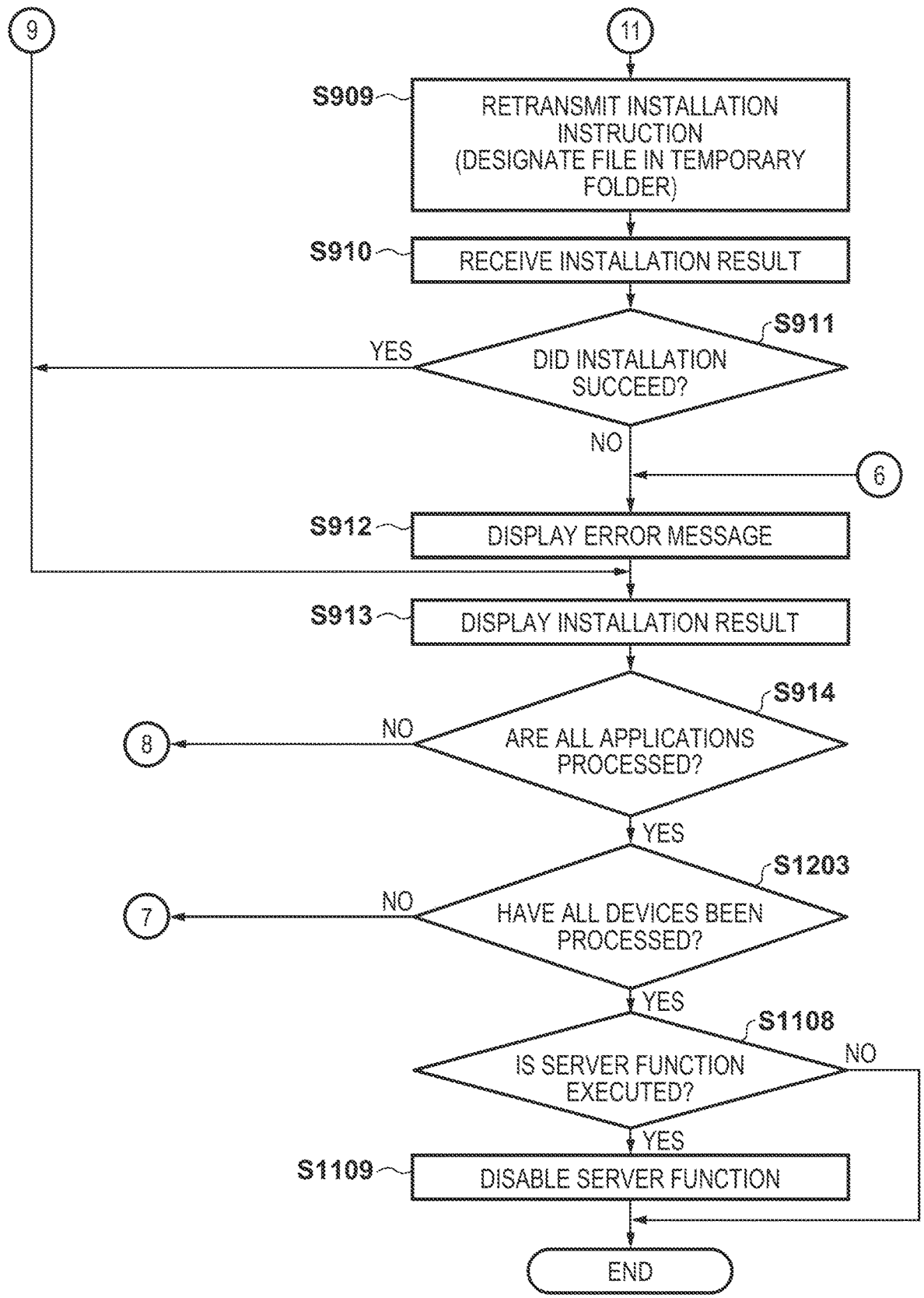
FIG. 12B is a view illustrating an installation processing flow of the device registration application.

FIG. 12A-1, FIG. 12A-2 and FIG. 12B are flowcharts that indicates an example of installation processing for the device registration application which indicates the present embodiment. Note that, because FIG. 12A-1, FIG. 12A-2 and FIG. 12B result from dividing one flow, they are referred to together as FIG. 12.

From out of target MFPs 101, the remote installation processing unit 401 specifies one unprocessed MFP, for example the MFP 101, as a processing target (step S1201), and the processing proceeds to step S1202. Here, the unprocessed MFP 101 indicates something for which there is installation waiting (preparation complete) 645 in FIG. 6B.

In step S1202, the remote installation processing unit 401 determines whether an installation file, which is a target of installation, has been downloaded to the temporary folder of the PC 100. For the determination of whether this has been downloaded, the application information downloaded at the time of the processing of step S906 and the download destination are saved, and it is determined whether items (the same ID 714 and the same version 716) that are the same as those of the installation target application are included in the application information. If the same items are included, it can be determined that the application has been downloaded. In addition, configuration may be taken such that, if file names are uniquely defined, simply make the determination by whether a file of the same name has been downloaded. Note that the downloaded installation file may have been downloaded by previous installation processing, and may be have been separately downloaded.

If it is determined in step S1202 that the installation file has been downloaded to the temporary region, the processing proceeds to step S909, and the downloaded file is used to instruct the MFP 101 to execute installation again. If it is determined that the application has not been downloaded, the processing proceeds to step S901.

If it is determined in step S914 that processing is complete for all applications, it is determined in step S1203 whether processing is complete for all target MFPs 101. If it is determined that processing is complete, the processing proceeds to step S1108, and if there is an unprocessed MFP 101, the processing returns to step S1201, and installation processing is executed with the unprocessed MFP 101 as a target.

By the embodiment described above, if there is an installation file that has already been downloaded to the PC 100 in the past, it is possible to use it to instruct the MFP 101 to perform installation. As a result, it is possible to avoid redundant processing in a case of performing installation to a plurality of MFPs 101, and efficiently execute installation.

Fourth Embodiment

In the installation processing described in the first embodiment through the third embodiment, the installation file of the application to install is decided in accordance with a definition of the application information 700. However, for example, there may be a case in which it is desirable to prepare a local server (not shown) on an intranet, and perform operation by arranging installation files there (for example, a case in which it is desirable to cause an application to be pre-installed in pre-setting at a factory).

The present embodiment is made in consideration of such a configuration, and using FIG. 13A, FIG. 13B-1, FIG. 13B-2, and FIG. 14, description is given below for an example of, when a setting file for customization is arranged, using an installation file of a download destination defined in the setting file to execute installation. Note that configuration and processing which is not particularly clarified is assumed to be the same as something in all of the first embodiment to the third embodiment. Note that, because FIG. 13A, FIG. 13B-1 and FIG. 13B-2 result from dividing one flow, they are referred to together as FIG. 13.

[Customization Setting File]

Using FIG. 14, description is given regarding a setting file 1400 used in the present embodiment. By using the setting file 1400, for example it is possible to change a download destination by defining the setting file 1400 in a case of wishing to change the download destination of an application to install by the device registration application 400. Here, description is given by taking an aspect where the setting file 1400 is defined in an XML format as an example, but there is no particular limitation to this format, and may be in another format.

The setting file 1400 includes application information 1401, and the application information 1401 also includes basic information 1410 of the application, a URL 1420 of the download destination of the application file of the application to install, and a URL 1430 of a download destination of a license file.

The basic information 1410 of the application is defined in accordance with an application name 1411, a version 1412 of the application, and an application ID 1413. If the setting file 1400 is present (is arranged in a predetermined location), the device registration application 400 reads the setting file 1400, and, if a definition of the application information 1401 is present, performs processing to set the download destinations at a time of installation as the URL 1420 of the download destination of the application file and the URL 1430 of the download destination of the license file.

[Installation Flow for Device Registration Application (PC)]

Figure 13A:
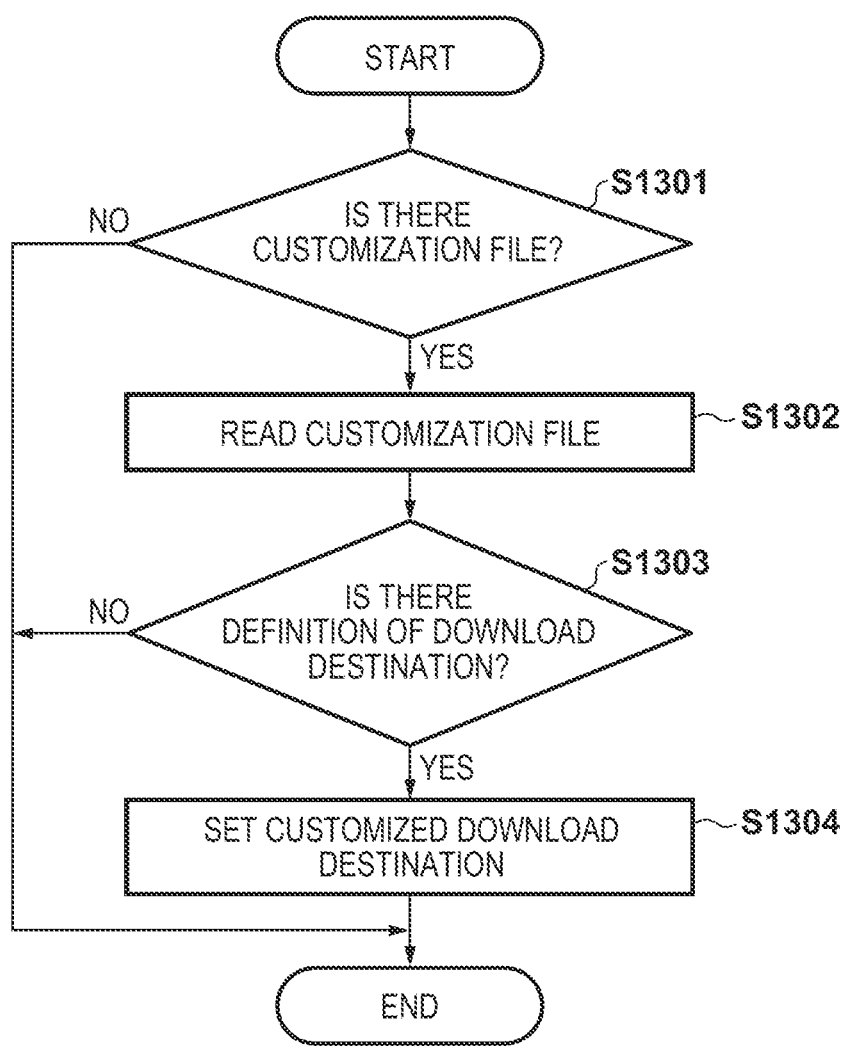
FIG. 13A is a view illustrating an installation processing flow of a device registration application.
Figures 1, 13B:
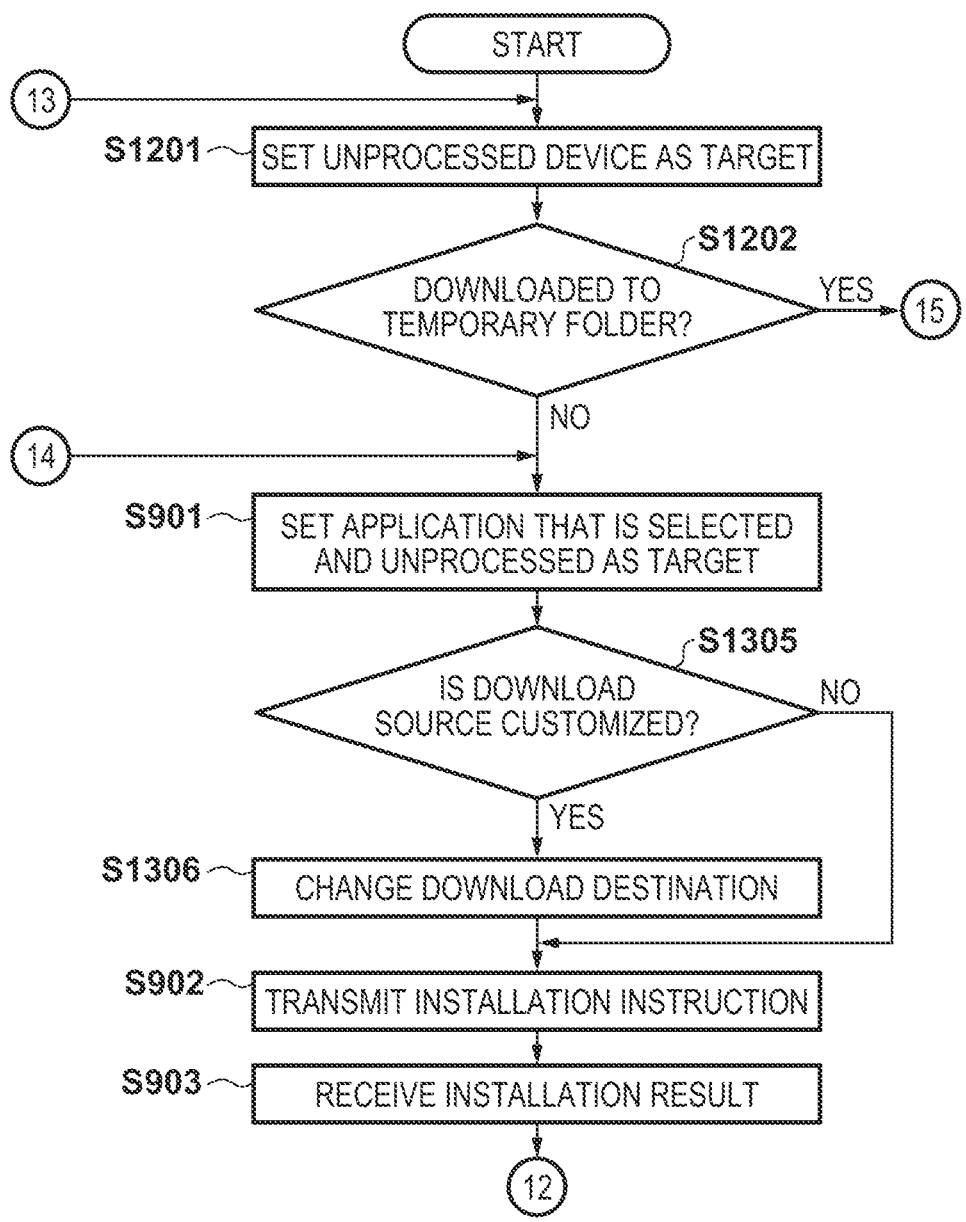
Figures 2, 13B:
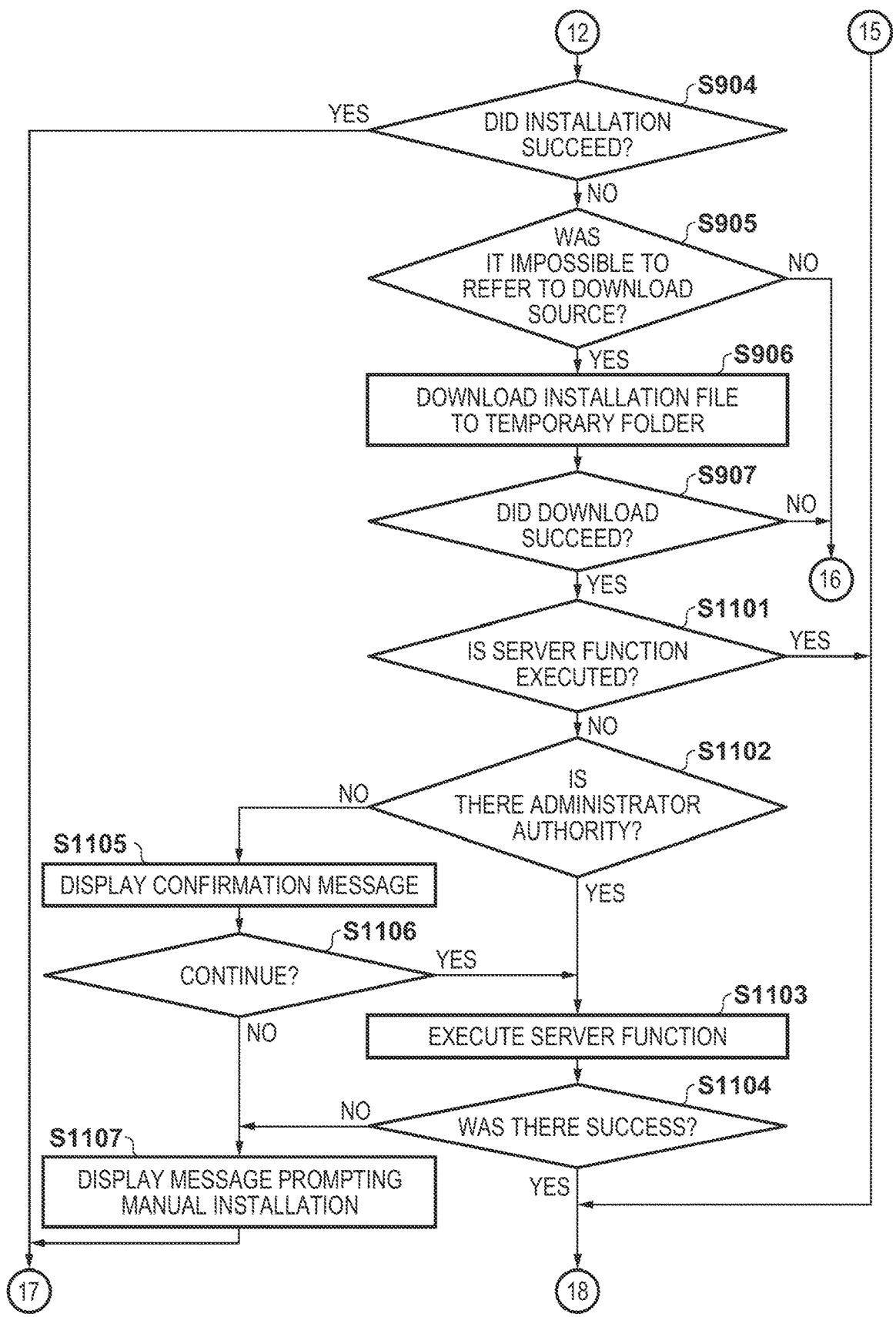
Figure 13C:
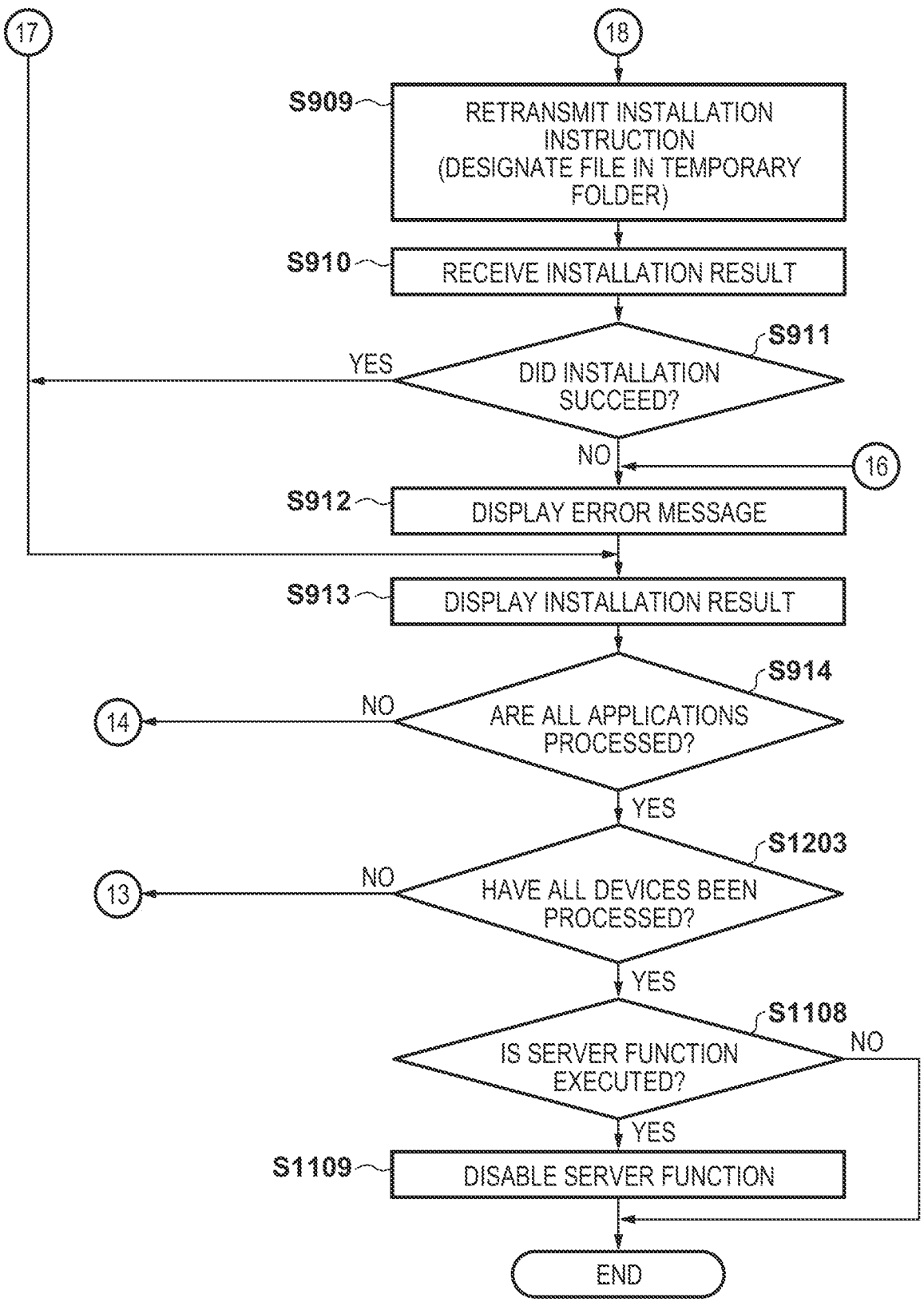
FIG. 13C is a view illustrating an installation processing flow of the device registration application.
Figure 15A:
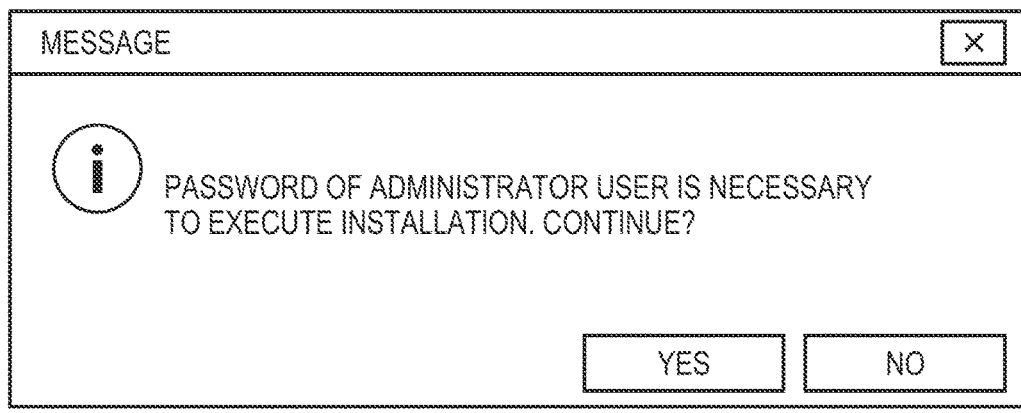
FIG. 15A, FIG. 15B, and FIG. 15C are views illustrating GUI displays (messages) of a device registration application.
Figure 15B:
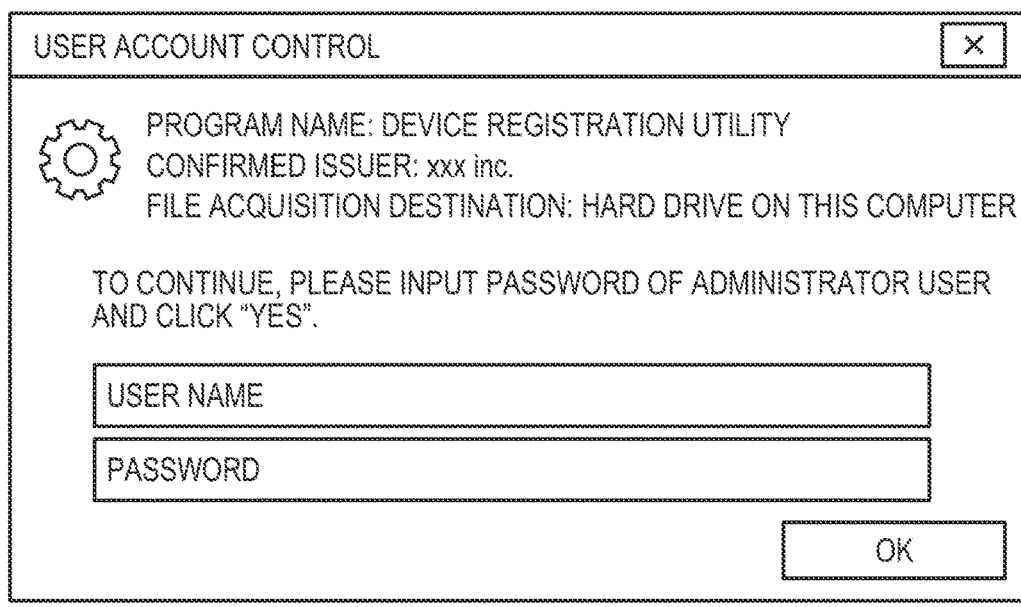
Figure 15C:
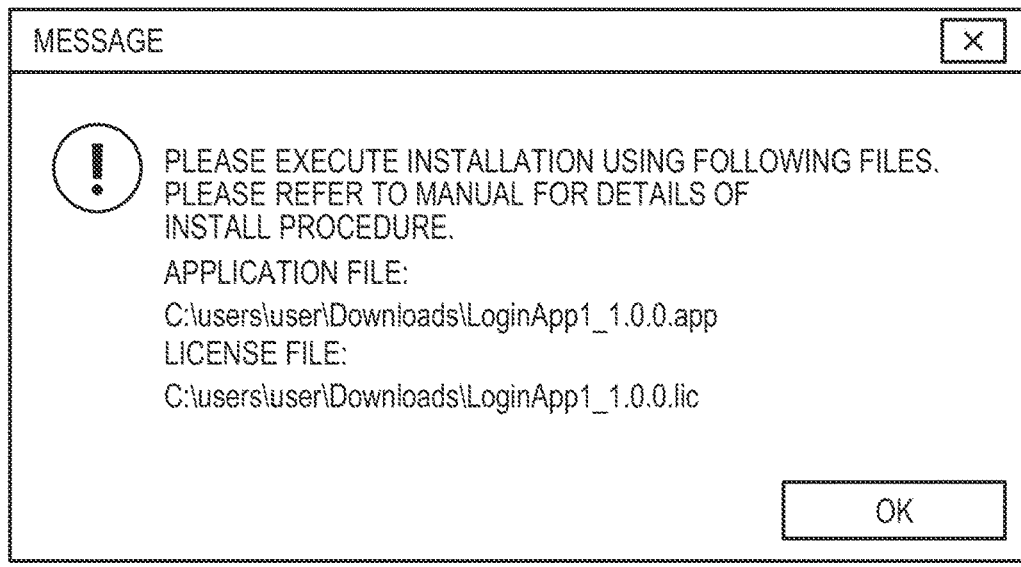

FIG. 13A to FIG. 13C are flowcharts that indicates an example of installation processing for the device registration application which indicates the present embodiment. Note that the same reference numeral is added for processing already described above, and description thereof is omitted.

Firstly, using step S1301 through step S1304 of FIG. 13A, description is given regarding processing for confirming whether or not there is a customization setting. As a timing when this processing is executed, there is an aspect such as where it is executed once when the device registration application 400 is activated, for example.

The remote installation processing unit 401 confirms whether there is a setting file for customization (step S1301). Specifically, a determination is made as to whether a file (the setting file 1400) with a predetermined file name is present at a predetermined location (for example, the same location as the arrangement location of the executable file for the device registration application 400). If it is determined that the setting file 1400 is not present the processing ends, and if it is determined to be present the processing proceeds to step S1302.

In step S1302, the remote installation processing unit 401 reads the setting file 1400.

In step S1303 confirms whether a download destination has been defined. Specifically, a determination is made as to whether the application information 1401 and a download destination are defined in the definition of the setting file 1400. If it is determined not to be defined the processing ends, and if it is determined to be defined the processing proceeds to step S1304.

In step S1304, the remote installation processing unit 401 holds information of the application information 1401 as information of the customized download destination (holds a value that can be referred to at any timing in the device registration application 400).

In accordance with the presence or absence of the above value that is held, the download destination for when installation processing is executed is changed. Specifically, this corresponds to the processing of step S1305 and step S1306 in FIG. 13B-1, and in step S1305, the remote installation processing unit 401 confirms the presence or absence of customization information. This is performed by determining whether there is a definition of an application that is currently an installation target in the application information 1401 which is held by the processing of step S1304. For example, it is determined whether there is information for which the ID 714 and the version 713 of the application of the application information 702, which is the installation target, match the application ID 1413 and the version 1412. If there is something for which there is a match, it is determined that there is customization information for the installation target application.

In step S1306, the remote installation processing unit 401 changes the download destination of the application that is the target of processing to be the download destination defined in the application information 1401, and, in step S902, transmits an installation instruction to the MFP 101.

By the present embodiment, it is possible to change (customize) a download destination of an installation file by defining a setting file.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-115426, filed Jun. 18, 2018, which is hereby incorporated by reference herein in its entirety.

What is claimed is:

1. An information processing apparatus comprising:
a memory storing instructions; and
a processor that implements the instructions to execute a plurality of tasks, including:
  a determination task that determines a result of installation processing of an application from an external server storing the application to a device;
  a downloading task that downloads the application from the external server upon the determination task determines that the installation processing was not successful due to unsuccessful downloading of the application from the external server; and
  a transmission task that transmits, to the device, an installation instruction for the application together with location information of the downloaded application after the downloading task has downloaded the application.

2. The information processing apparatus according to claim 1, wherein the plurality of tasks include:
an instructing tasks that transmits, to the device, an installation instruction for causing the device to install the application provided by the external server; and
a reception that, after the device has performed the installation processing of the application from the external server in accordance with the installation instruction by the instructing task, receive a result of the installation processing from the device,
wherein the determination task determines, based on the result, whether the application has been downloaded to the device.

3. The information processing apparatus according to claim 1, wherein the plurality of tasks include:
a server task that causes the information processing apparatus to function as a server to accept an obtainment request for the device to obtain the application based on the location information,
wherein the transmission task transmits the installation instruction to the device after executing the server task.

4. The information processing apparatus according to claim 3, wherein the plurality of tasks include:
a confirmation task that confirms an administrator authority of a user before executing the server task,
wherein the server task is executed upon the confirmation tasks confirming the administrator authority of the user; and
a display task that, upon the confirmation task not confirming the administrator authority of the user, displays the download destination of the application downloaded by the downloading task.

5. The information processing apparatus according to claim 4, wherein the confirmation task:
confirms the administrator authority of the user who successfully logged into the information processing apparatus as the administrator authority based on authentication information of the user; and
prompts a user with the administrator authority to loci into the information processing apparatus in a case where the user who successfully logged into the information processing apparatus is not the administrator authority based on the authentication information of the user.

6. The information processing apparatus according to claim 4, wherein:
the display task, upon the confirmation task not confirming the administrator authority of the user, further displaying a remote screen displaying a screen provided by the device, and
in response to the displayed download destination being input on the remote screen, the device installs the application from the download destination.

7. The information processing apparatus according to claim 1, wherein:
the plurality of tasks include a second determination task that determines whether the application has been downloaded by the downloading task,
upon the second determination task determines that the application has been downloaded, the transmission task transmits the installation instruction to the device.

8. The information processing apparatus according to claim 1, wherein a file for instructing a download source from which the application is downloaded by the downloading task is used to designate the download source.

9. The information processing apparatus according to claim 8, wherein the plurality of tasks include:
a file determining task that determines presence or absence of the file; and
a designating task that:
upon the file determining task determines that the file is present, designates a download source where the file is included; and
upon the file determining task determines that the file is not present, designates a predetermined download source.

10. The information processing apparatus according to claim 1, wherein:
the device is an image processing apparatus having at least a print function, and
the application is for expanding a function of the image processing apparatus.

11. A method of controlling an information processing apparatus, the method comprising:
determining a result of installation processing of an application from an external server storing the application to a device;
downloading the application from the external server upon the determining determines that the installation processing was not successful due to unsuccessful downloading of the application from the external server; and
transmitting, to the device, an installation instruction for the application together with location information of the downloaded application after the downloading has downloaded the application.

12. A non-transitory computer-readable medium storing a program executable by a computer to execute a method comprising:
determining a result of installation processing of an application from an external server storing the application to a device;
downloading the application from the external server upon the determining determines that the installation processing was not successful due to unsuccessful downloading of the application from the external server; and
transmitting, to the device, an installation instruction for the application together with location information of the downloaded application after the downloading has downloaded the application.

13. An information processing apparatus comprising:
a memory storing instructions; and
a processor that implements the instructions to:
transmit, to a device, a first request for requesting the device to download an application from an external server;
receive an error corresponding to the first request, the error indicating that the device cannot download the application from the external server;
download the application from the external server in a case where the error is received; and
a second request and location information of the downloaded application to the device, wherein the second request requests the device to download the downloaded application based on the location information.

14. The information processing apparatus according to claim 13, wherein the error indicates that the device cannot download the application from the external server due to not being able to refer a download source of the application.

15. The information processing apparatus according to claim 13, wherein the error indicates that the device cannot download the application from the external server due to not being able to find a download source of the application.

16. The information processing apparatus according to claim 13, wherein the error indicates that the device cannot download the application from the external server because access to the application is denied.

17. A non-transitory computer-readable medium storing a program executable by a computer to execute a method comprising:
- transmitting, to a device, a first request for requesting the device to download an application from an external server;
- receiving an error corresponding to the first request, the error indicating that the device cannot download the application from the external server;
- downloading the application from the external server in a case where the error is received; and
- transmitting a second request and location information of the downloaded application to the device, wherein the second request requests the device to download the downloaded application based on the location information.

18. An information processing apparatus comprising:
- a memory storing instructions; and
- a processor that implements the instructions to:
  - transmit a first request to a device, wherein the first request requests the device to download an application from an external server;
  - download the application from the external server in a case where the device failed to download the application from the external server; and
  - transmit a second request and location information of the downloaded application to the device that failed to download the application from the external server, wherein the second request requests the device to download the downloaded application based on the location information.

19. The information processing apparatus according to claim 18, wherein the processor downloads the application upon the processor receiving a predetermined information that is transmitted from the device in a case where the device failed to download the application from the external server due to a predetermined cause.

20. A non-transitory computer-readable medium storing a program executable by a computer to execute a method comprising:
- transmitting a first request to a device, wherein the first request requests the device to download an application from an external server;
- downloading the application from the external server in a case where the device failed to download the application from the external server; and
- transmitting a second request and location information of the downloaded application to the device that failed to download the application from the external server, wherein the second request requests the device to download the downloaded application based on the location information.

* * * * *